US011516425B2

(12) United States Patent
Maeshiba et al.

(10) Patent No.: US 11,516,425 B2
(45) Date of Patent: Nov. 29, 2022

(54) DISPLAY APPARATUS

(71) Applicant: Sony Corporation, Tokyo (JP)

(72) Inventors: Hiroaki Maeshiba, Tokyo (JP);
Daisuke Yamaoka, Kanagawa (JP);
Shinpei Kondo, Kanagawa (JP); Hiroki Matsuoka, Saitama (JP)

(73) Assignee: Sony Corporation

( * ) Notice: Subject to any disclaimer, the term of this patent is extended or adjusted under 35 U.S.C. 154(b) by 0 days.

(21) Appl. No.: 16/954,259

(22) PCT Filed: Dec. 6, 2018

(86) PCT No.: PCT/JP2018/044875
§ 371 (c)(1),
(2) Date: Jun. 16, 2020

(87) PCT Pub. No.: WO2019/131041
PCT Pub. Date: Jul. 4, 2019

(65) Prior Publication Data
US 2021/0014449 A1  Jan. 14, 2021

(30) Foreign Application Priority Data

Dec. 28, 2017 (JP) .............................. JP2017-254118
Aug. 30, 2018 (JP) .............................. JP2018-161266

(51) Int. Cl.
*H04R 1/02* (2006.01)
*H04N 5/64* (2006.01)
(Continued)

(52) U.S. Cl.
CPC ........... *H04N 5/642* (2013.01); *H04R 1/2811* (2013.01); *H04R 7/045* (2013.01); *H04R 2499/15* (2013.01)

(58) Field of Classification Search
CPC ........ H04R 2205/022; H04R 2201/401; H04R 1/02
(Continued)

(56) References Cited

U.S. PATENT DOCUMENTS 6,285,770 B1 * 9/2001 Azima ................. B42D 15/022
381/152
6,332,029 B1 * 12/2001 Azima ................... H04R 1/021
381/152
(Continued)

FOREIGN PATENT DOCUMENTS

CN          1788525 A      6/2006
CN          1799280 A      7/2006
(Continued)

OTHER PUBLICATIONS

International Search Report from Application No. PCT/JP2018/044875 dated Feb. 19, 2019, 3 pages.
(Continued)

*Primary Examiner* — Suhan Ni
(74) *Attorney, Agent, or Firm* — Lerner, David, Littenberg, Krumholz & Mentlik, LLP

(57) ABSTRACT

A display apparatus according to an embodiment of the present disclosure includes: a display cell that displays an image and has a thin-plate shape; one or more vibration exciters that are disposed on rear-surface side of the display cell and cause the display cell to vibrate; and an opposing plate opposed to the display cell with an air gap in between. The display apparatus further includes a sound-spreading adjustment member that is disposed between the display cell and the two or more vibration exciters, and controls spreading of a sound generated by vibration caused by the two or more vibration exciters.

6 Claims, 21 Drawing Sheets

(51) Int. Cl.
*H04R 1/28* (2006.01)
*H04R 7/04* (2006.01)

(58) Field of Classification Search
USPC .................................... 381/152, 182, 388
See application file for complete search history.

(56) References Cited

U.S. PATENT DOCUMENTS

| | | | |
|---|---|---|---|
| 7,570,771 B2* | 8/2009 | Whitwell | H04R 7/045 |
| | | | 381/388 |
| 10,659,871 B2* | 5/2020 | Kim | H04R 1/021 |
| 2001/0040976 A1 | 11/2001 | Buos | |
| 2007/0071259 A1* | 3/2007 | Tojo | H04R 5/02 |
| | | | 381/388 |
| 2015/0036843 A1* | 2/2015 | Nabata | H04R 1/02 |
| | | | 381/151 |
| 2015/0341714 A1 | 11/2015 | Ahn et al. | |
| 2017/0280216 A1* | 9/2017 | Lee | H04R 5/02 |
| 2017/0280234 A1 | 9/2017 | Choi et al. | |

FOREIGN PATENT DOCUMENTS

| | | |
|---|---|---|
| CN | 1805457 A | 7/2006 |
| CN | 104183200 A | 12/2014 |
| CN | 105096778 A | 11/2015 |
| CN | 106406432 A | 2/2017 |
| CN | 107241675 A | 10/2017 |
| EP | 2164279 A1 | 3/2010 |
| EP | 2673944 A2 | 12/2013 |
| JP | 2002510182 A | 4/2002 |
| JP | 2007143010 A | 6/2007 |
| JP | 2009159104 A | 7/2009 |
| JP | 2014509028 A | 4/2014 |
| JP | 2015219528 A | 12/2015 |
| JP | 2017184223 A | 10/2017 |
| JP | 2017194223 A | 10/2017 |
| WO | 2009106427 A1 | 9/2009 |
| WO | 2012129247 A2 | 9/2012 |

OTHER PUBLICATIONS

Du Jun, Chen Juan:"Patent Analysis of Flat Speaker." Electroacoustic Technology Nov. 6, 2015 pp. 1-4.
Sun P, Park JH, Kwon JH, Hwang SM. "Development of slim speaker for use in flat TVs." IEEE transactions on magnetics. Oct. 18, 2012;48(11):4148-51.
Wang Yusheng, Wang Yuna:"Development of Distributed Magnetostrictive Flat Speakers." Electromechanical Engineering, Jul. 14, 2008; pp. 84-86.
Search Report from Office Action for Chinese Application No. 2018800819777 dated Apr. 6, 2021; 4 pages.

* cited by examiner

[ FIG. 1 ]
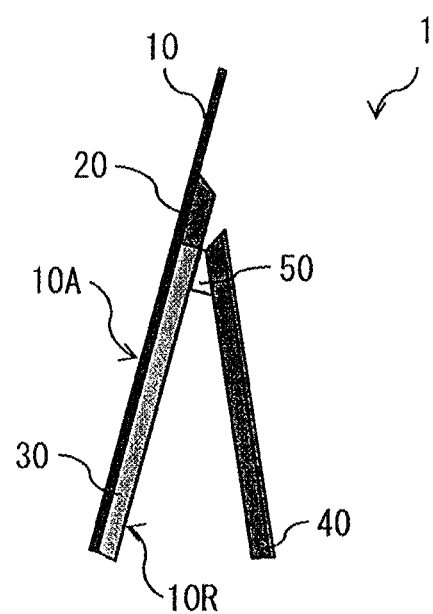

[ FIG. 2 ]
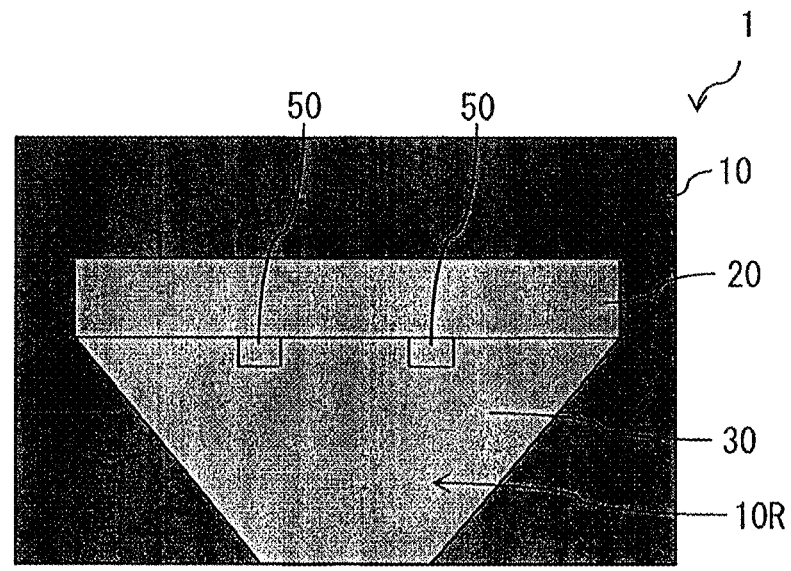
[ FIG. 3 ]
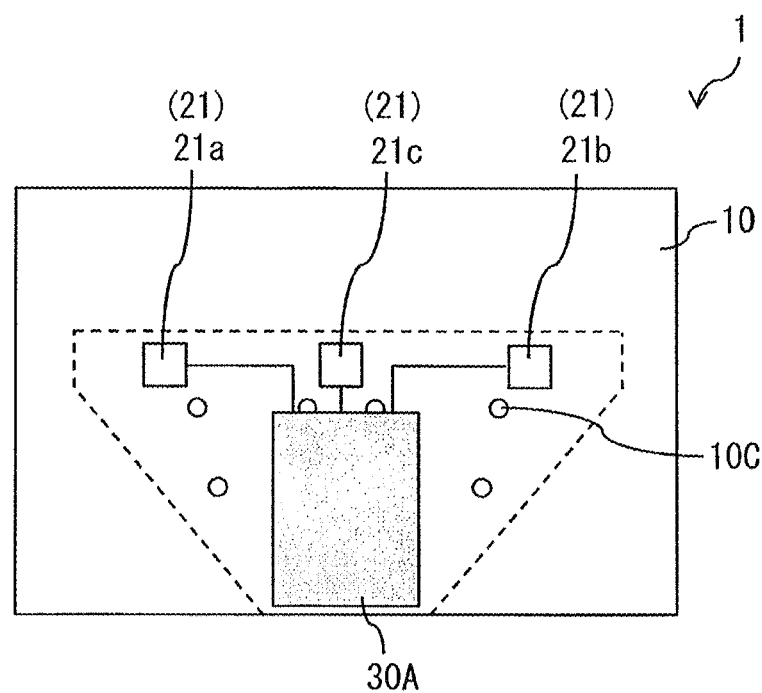

[ FIG. 4 ]
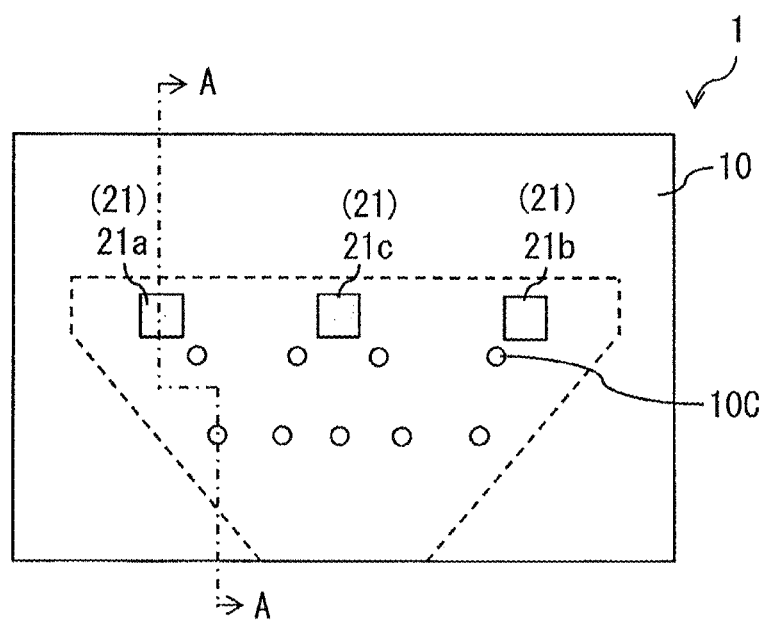

[ FIG. 5 ]
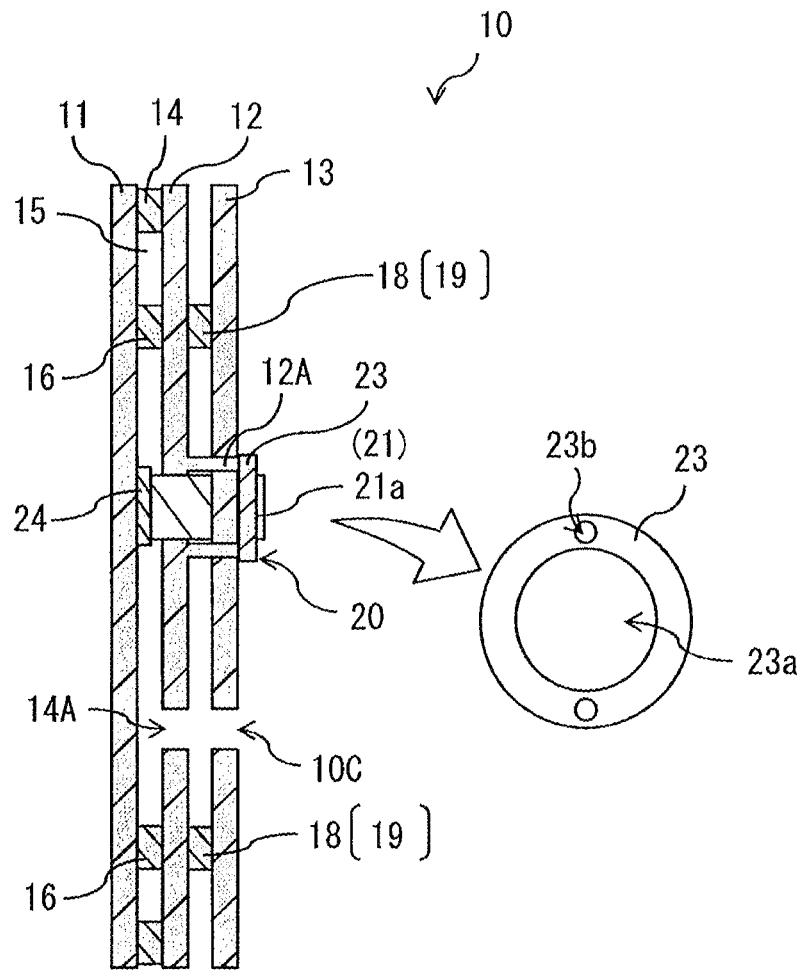
[ FIG. 6 ]
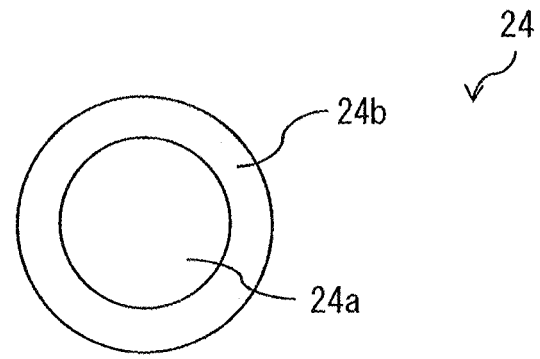

[ FIG. 7 ]
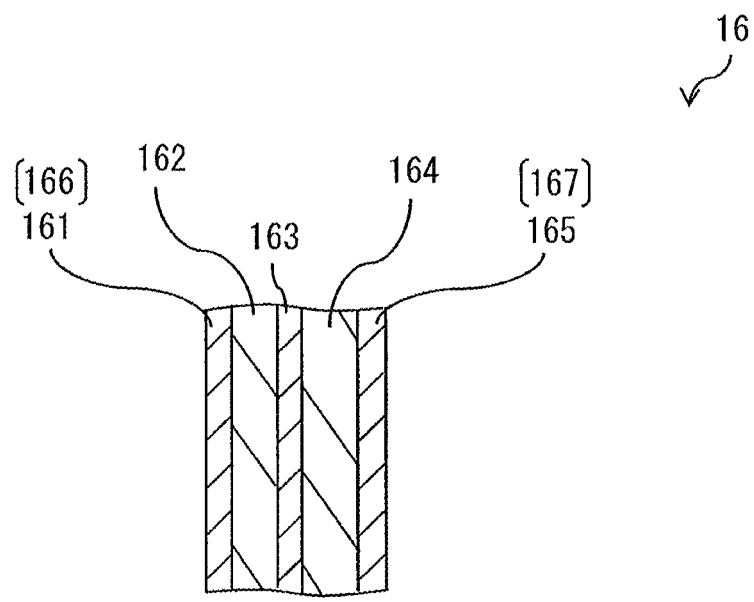
[ FIG. 8 ]
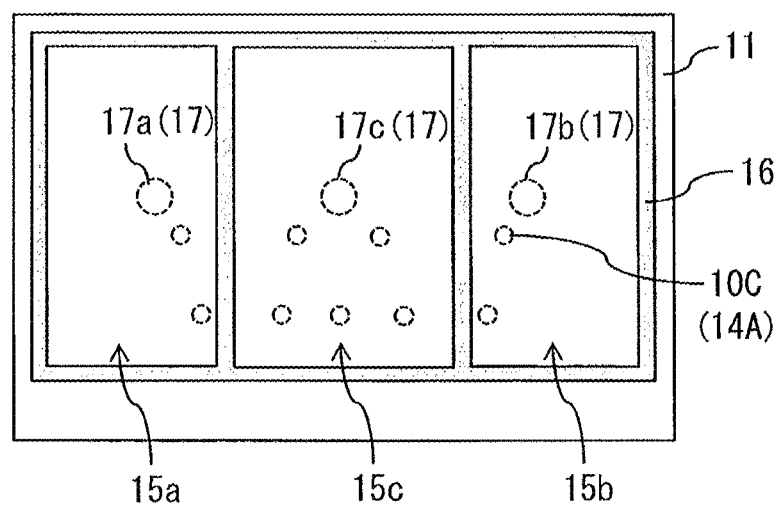

[ FIG. 9 ]
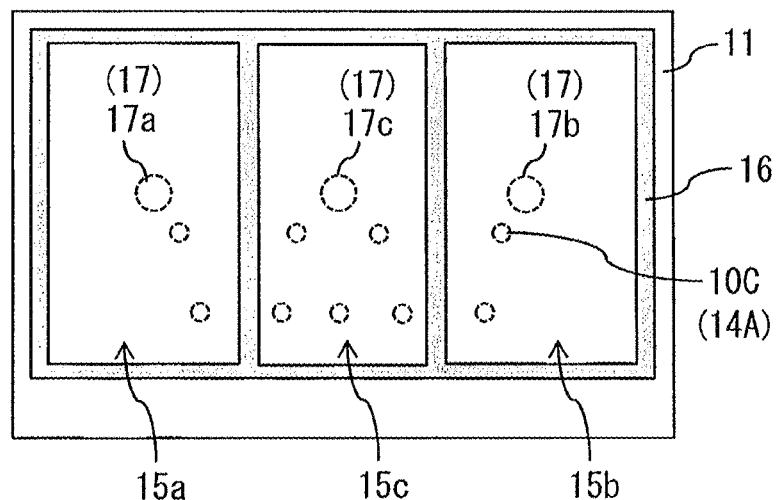
[ FIG. 10 ]
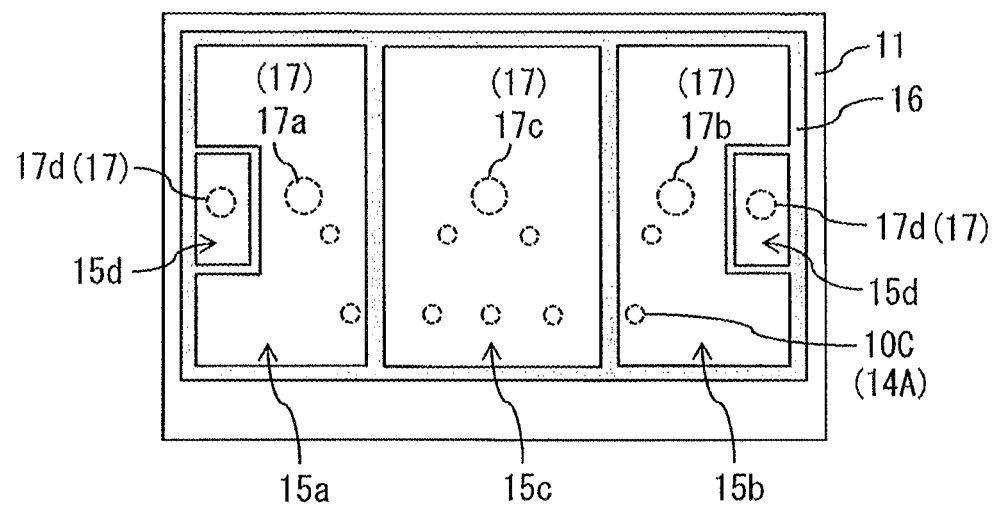

[ FIG. 11 ]
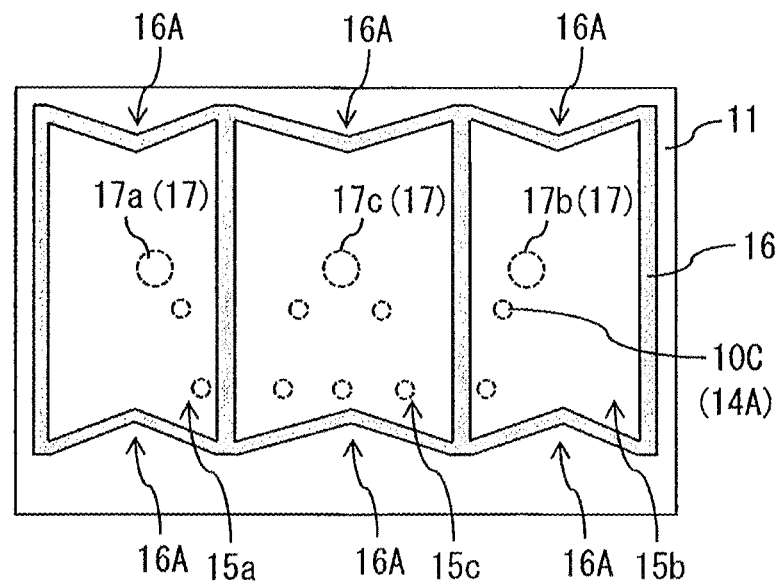
[ FIG. 12 ]
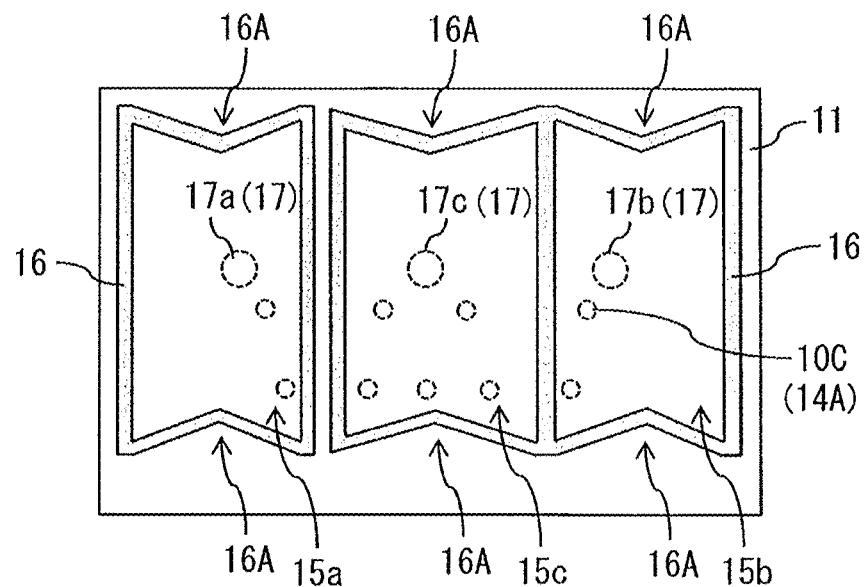

[ FIG. 13 ]
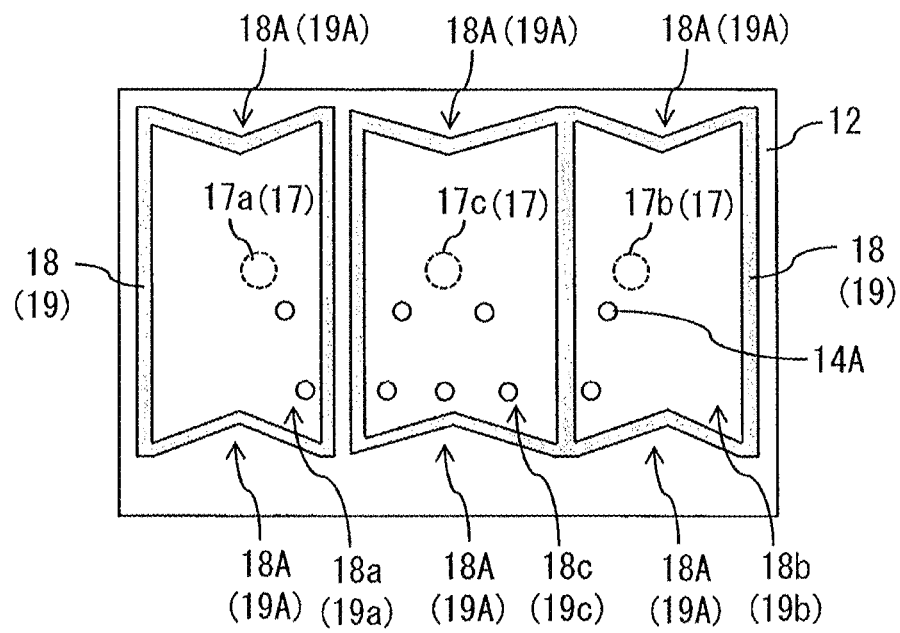
[ FIG. 14 ]
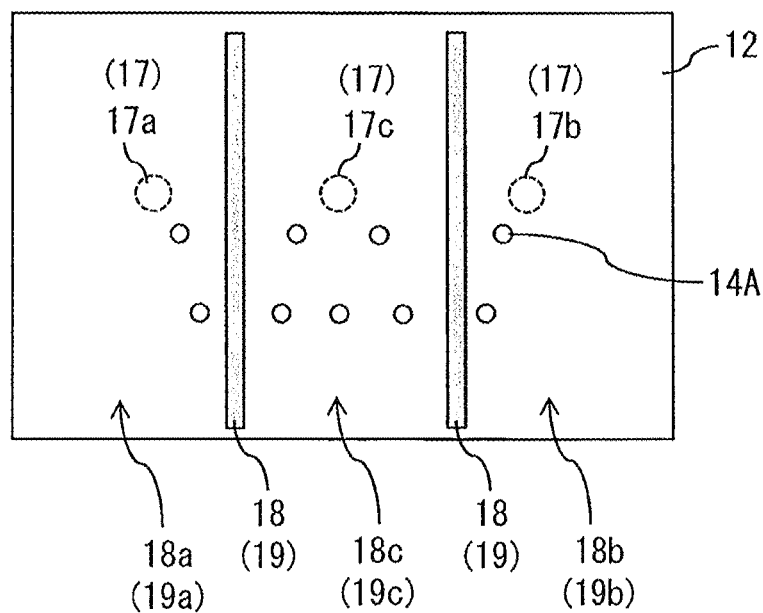

[ FIG. 15 ]
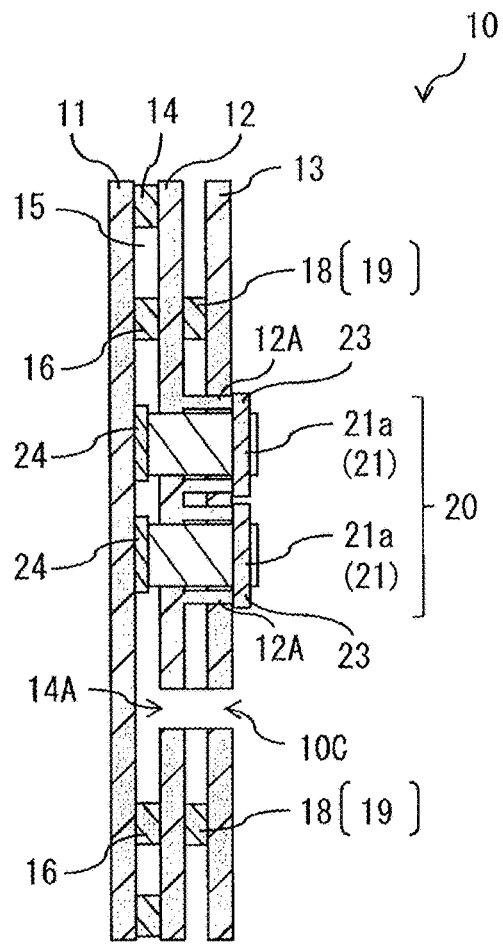
[ FIG. 16 ]
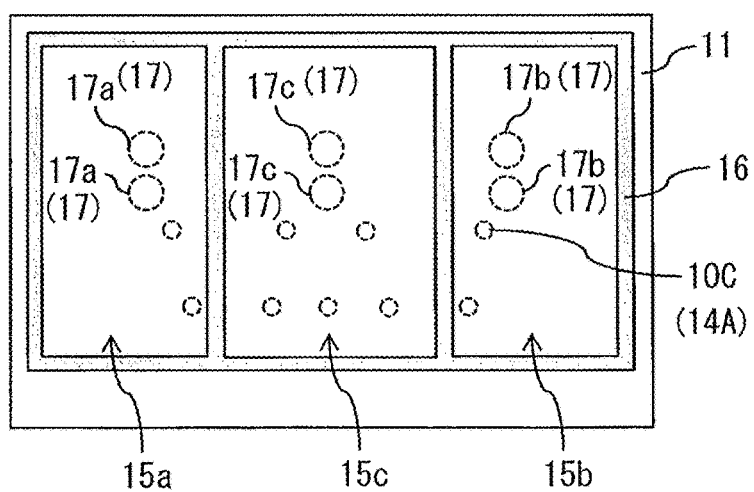

[ FIG. 17 ]
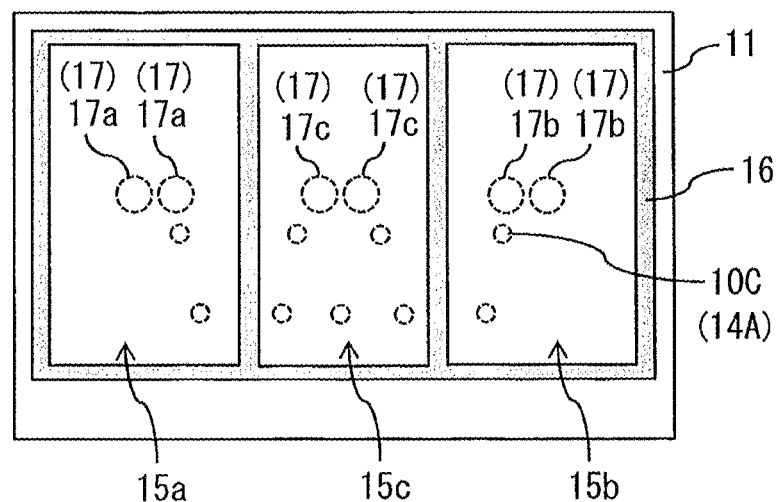
[ FIG. 18 ]
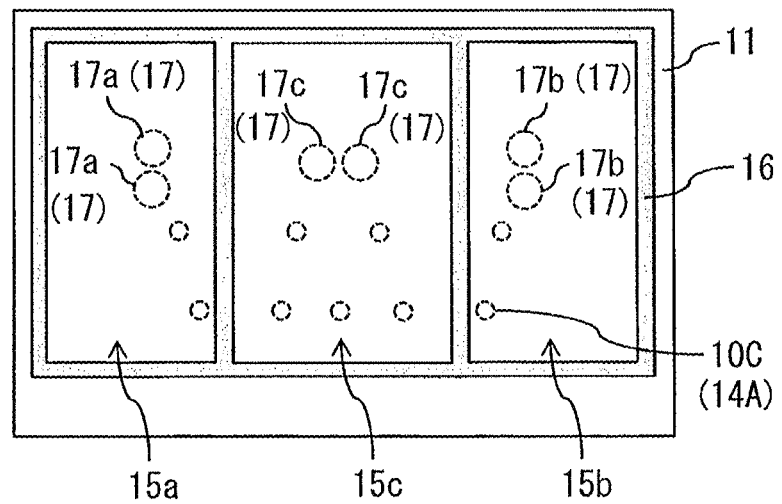

[FIG. 19]
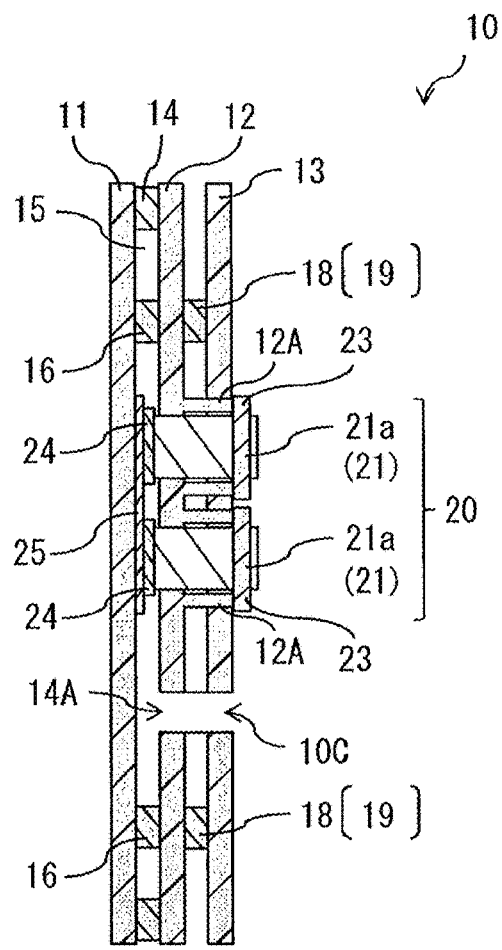
[FIG. 20]
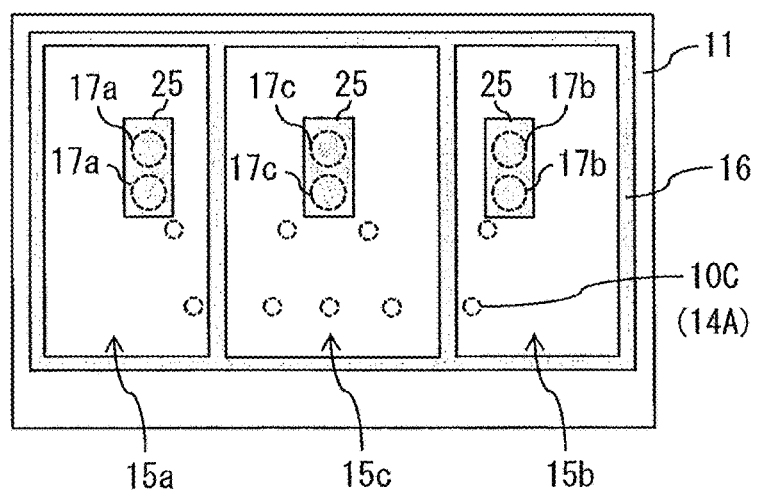

[ FIG. 21 ]
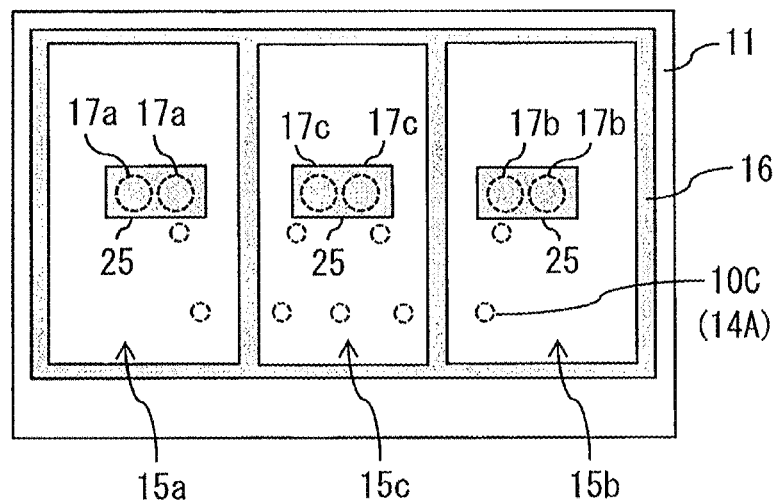
[ FIG. 22 ]
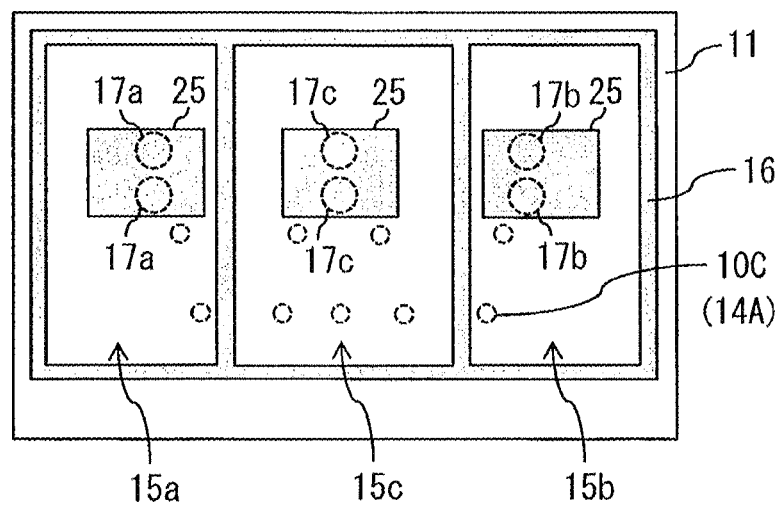

[ FIG. 23 ]
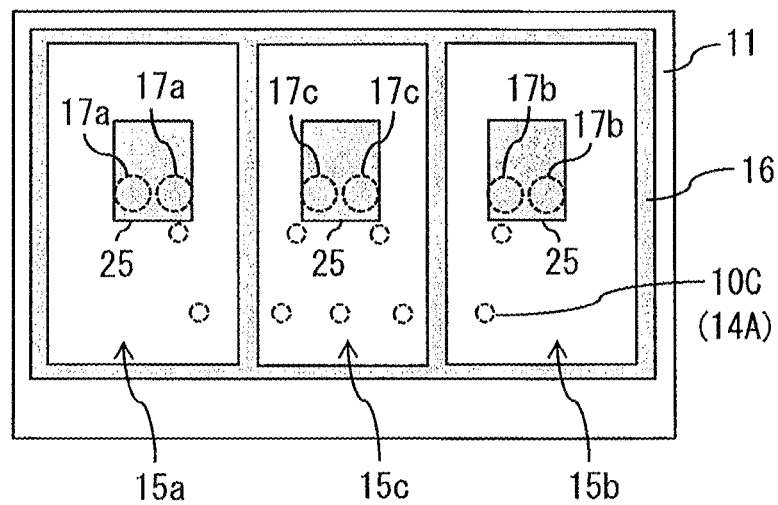
[ FIG. 24 ]
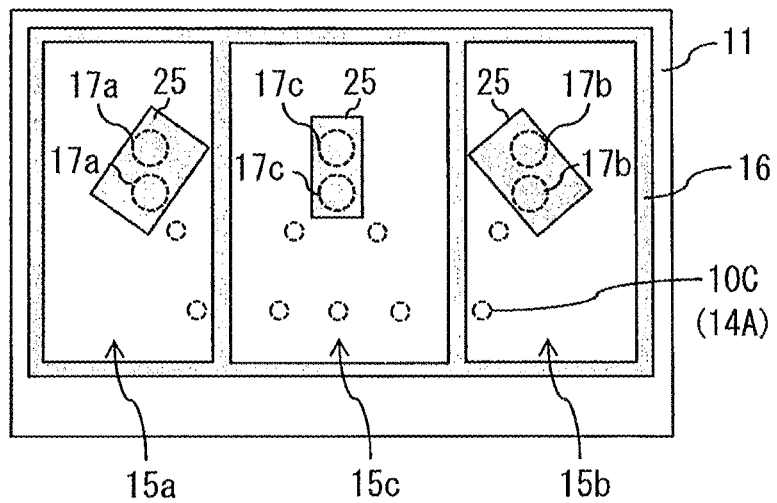

[ FIG. 25 ]
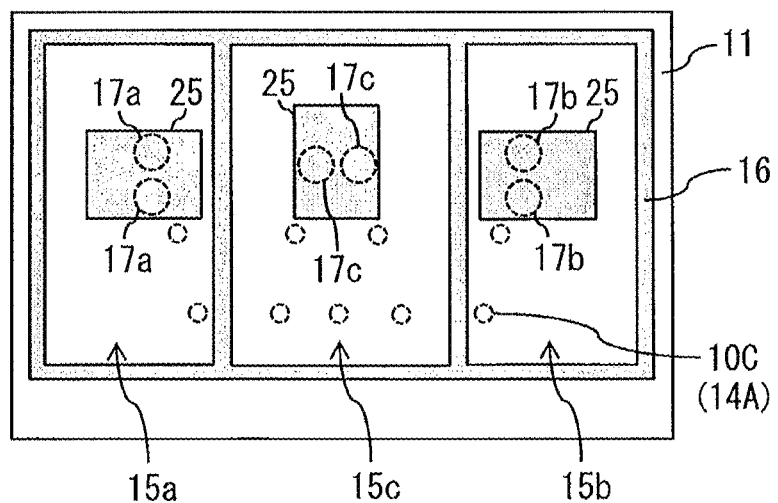
[ FIG. 26 ]
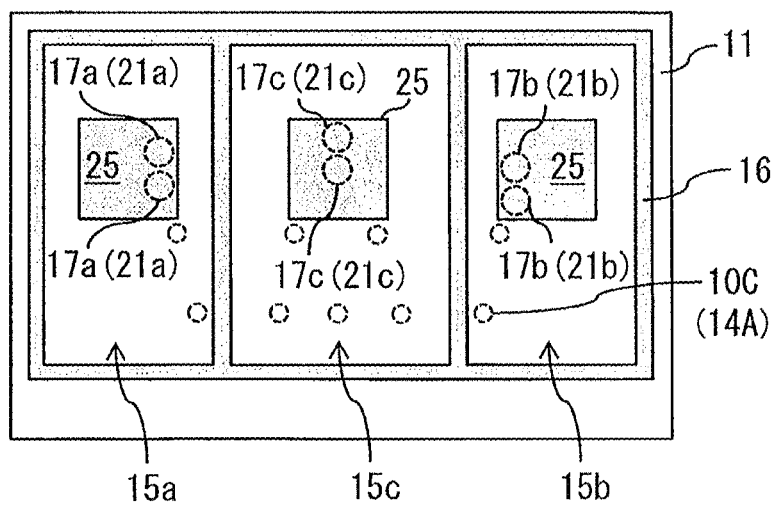

[ FIG. 27 ]
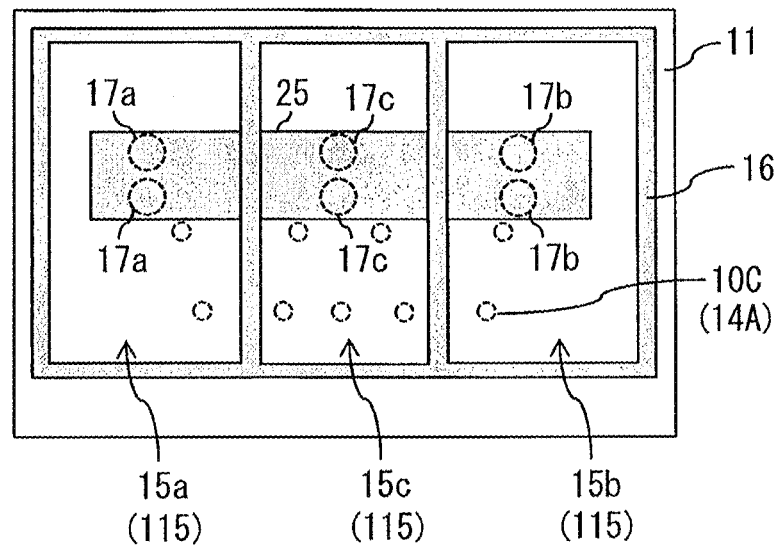
[ FIG. 28 ]
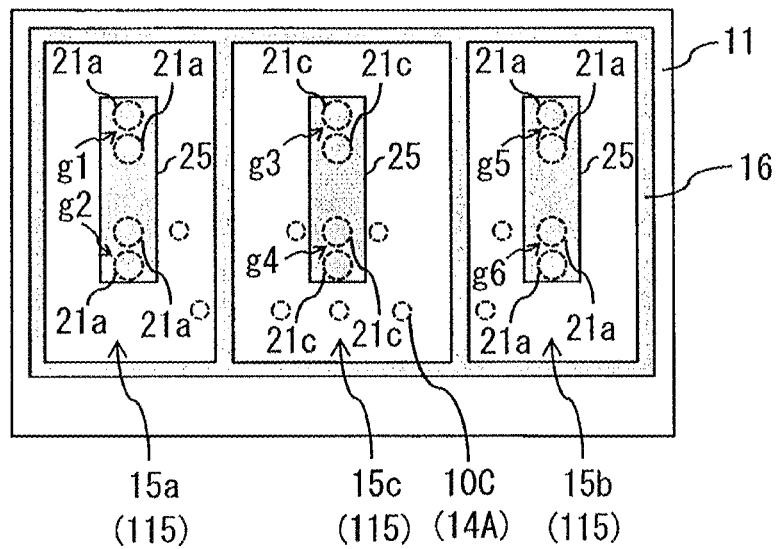

[ FIG. 29 ]
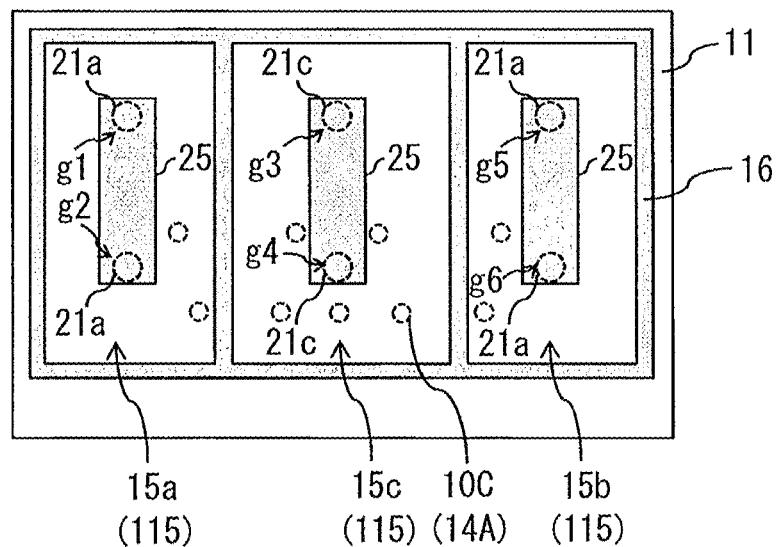
[ FIG. 30 ]
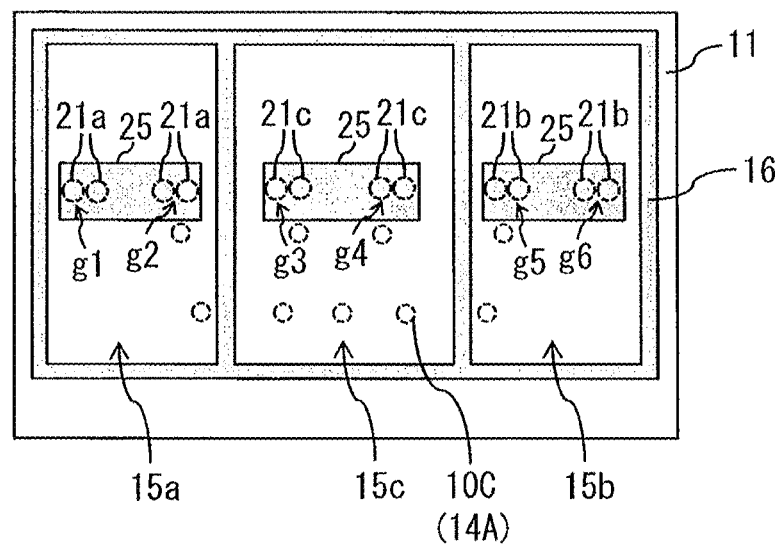

[ FIG. 31 ]
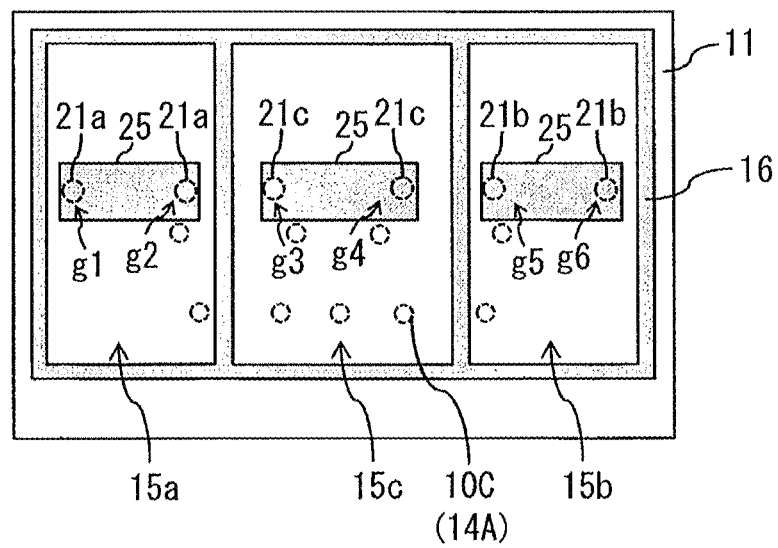
[ FIG. 32 ]
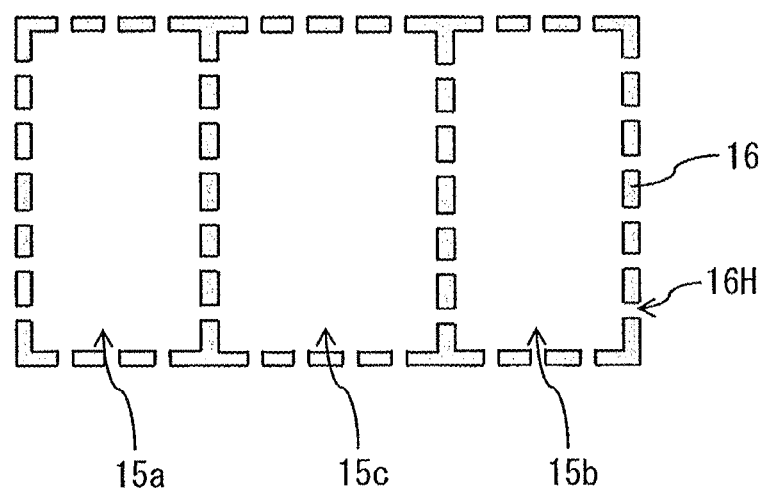

[ FIG. 33 ]
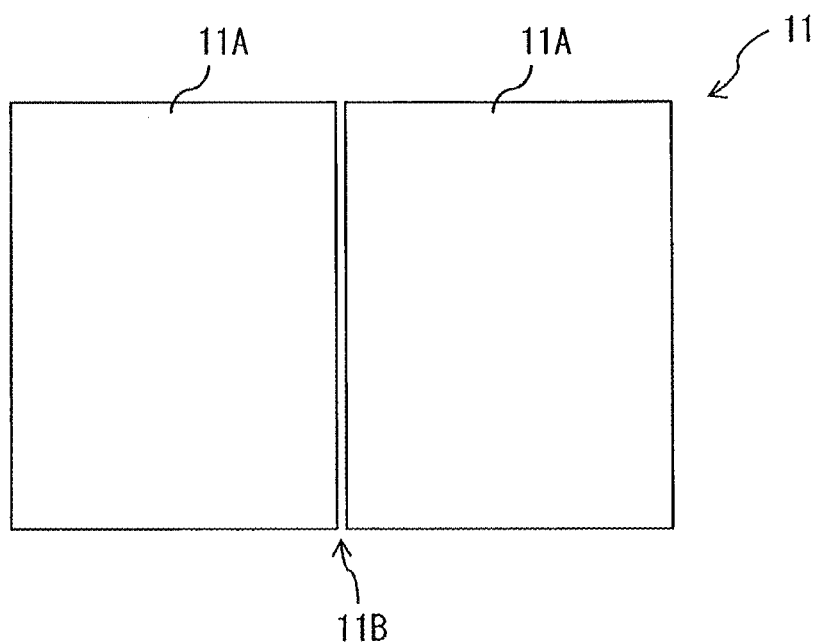
[ FIG. 34 ]
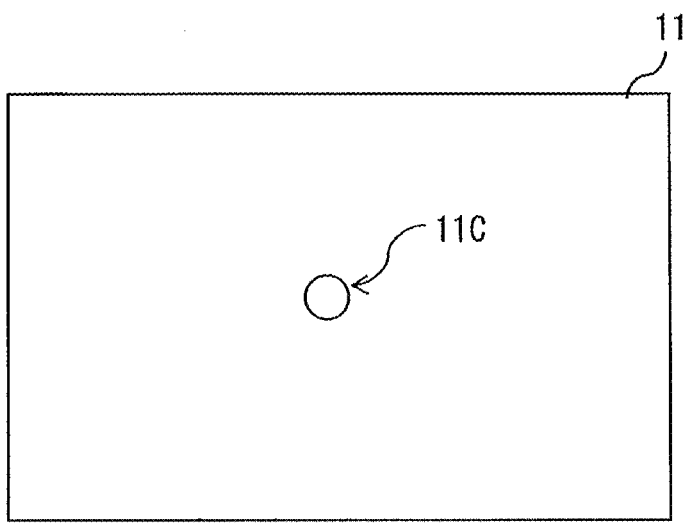

[ FIG. 35 ]
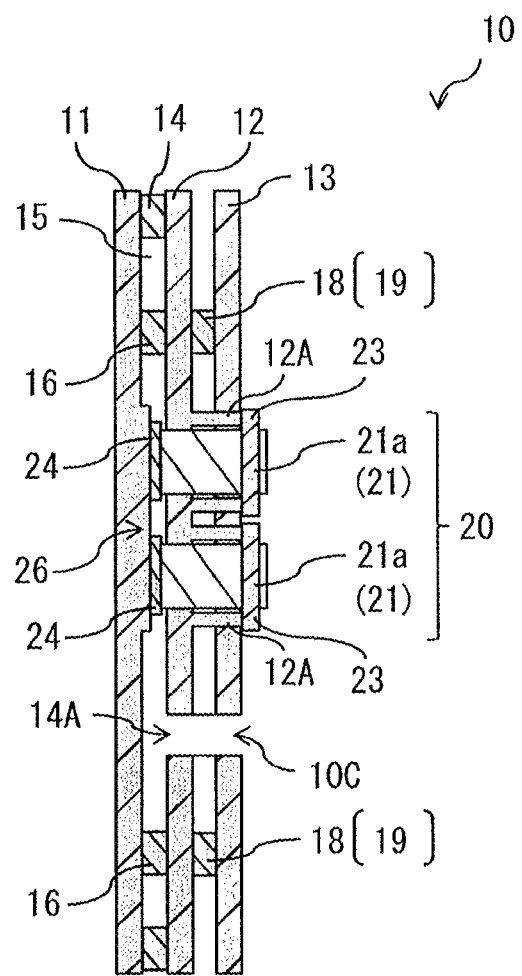

[ FIG. 36 ]
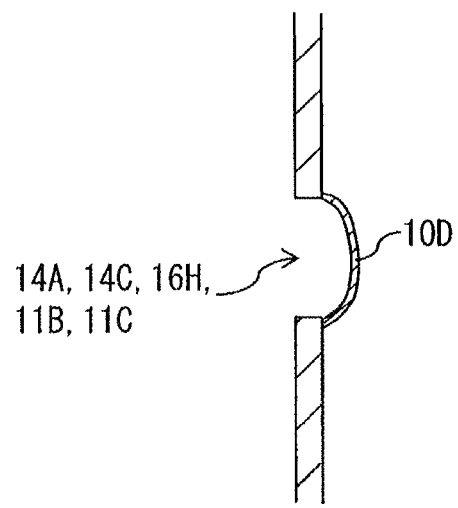

[ FIG. 37 ]
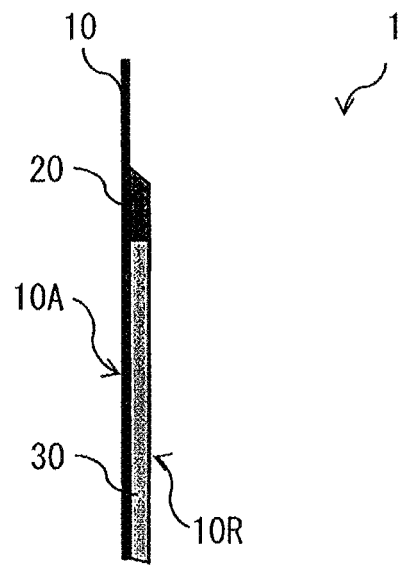
[ FIG. 38 ]
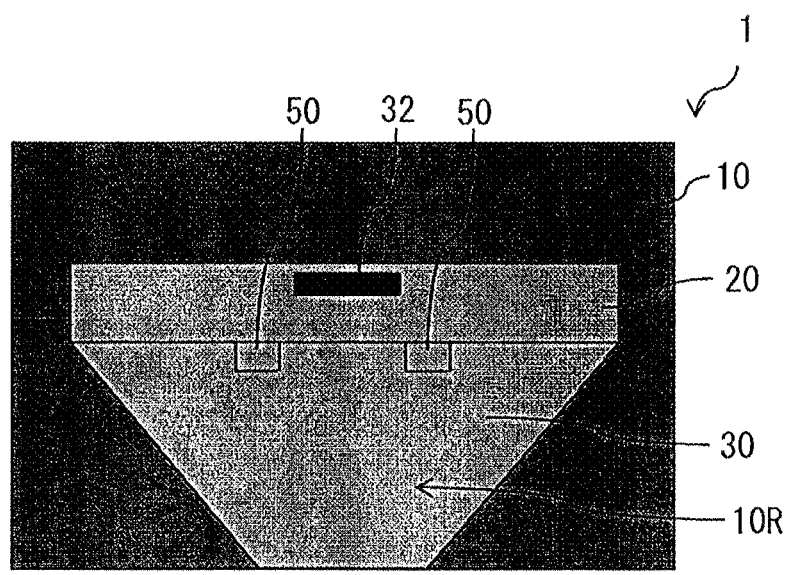

DISPLAY APPARATUS

CROSS-REFERENCE TO RELATED APPLICATIONS

This application is a national phase entry under 35 U.S.C. § 371 of International Application No. PCT/JP2018/044875 filed Dec. 6, 2018, which claims the priority from Japanese Patent Application No. 2017-254118 filed in the Japanese Patent Office on Dec. 28, 2017 and Japanese Patent Application No. 2018-161266 filed in the Japanese Patent Office on Aug. 30, 2018, the entire contents of which are hereby incorporated by reference.

TECHNICAL FIELD

The present disclosure relates to a display apparatus.

BACKGROUND ART

A decrease in thickness and weight of a display has been progressing rapidly. Along with this, a decrease in thickness and weight of a speaker has also been progressing, and it is proposed to use a flat-panel speaker (FPS) in place of a cone-type speaker. Furthermore, it is also proposed to use a display panel as a diaphragm in the flat-panel speaker. For example, referential PTLs 1 to 3 disclose the flat panel speaker.

CITATION LIST

Patent Literature

PTL 1: Japanese Unexamined Patent Application Publication No. 2007-143010
PTL 2: Japanese Unexamined Patent Application Publication No. 2009-159104
PTL 3: Japanese Unexamined Patent Application Publication (Translation of PCT Application) No. 2002-510182

SUMMARY OF THE INVENTION

In a field of a flat-panel speaker, further improvement in sound quality is expected. Therefore, it is desirable to provide a display apparatus that makes it possible to achieve further improvement in sound quality.

A display apparatus according to an embodiment of the present disclosure includes: a display cell that displays an image and has a thin-plate shape; two or more vibration exciters that are disposed on rear-surface side of the display cell and cause the display cell to vibrate; and an opposing plate opposed to the display cell with an air gap in between. The display apparatus further includes a sound-spreading adjustment member that is disposed between the display cell and the two or more vibration exciters, and controls spreading of a sound generated by vibration caused by the two or more vibration exciters.

BRIEF DESCRIPTION OF THE DRAWINGS

FIG. 1 is a diagram illustrating an example of a side configuration of a display apparatus according to an embodiment of the present disclosure.

FIG. 2 is a diagram illustrating an example of a rear configuration of the display apparatus in FIG. 1.

FIG. 3 is a diagram illustrating an example of a configuration of a rear surface of the display apparatus at a time when a rear cover in FIG. 2 is removed.

FIG. 4 is a diagram illustrating an example of the configuration of the rear surface of the display apparatus at a time when a circuit board in FIG. 3 is removed.

FIG. 5 is a diagram illustrating an example of a cross-sectional configuration along a line A-A in FIG. 4.

FIG. 6 is a diagram illustrating an example of a plane configuration of a portion, of a vibration-transmitting member in FIG. 5, that is in contact with a display cell.

FIG. 7 is a diagram illustrating an example of a cross-sectional configuration of a vibration-controlling member in FIG. 5.

FIG. 8 is a diagram illustrating an example of a plane configuration of the vibration-controlling member in FIG. 5.

FIG. 9 is a diagram illustrating an example of the plane configuration of the vibration-controlling member in FIG. 5.

FIG. 10 is a diagram illustrating an example of the plane configuration of the vibration-controlling member in FIG. 5.

FIG. 11 is a diagram illustrating an example of the plane configuration of the vibration-controlling member in FIG. 5.

FIG. 12 is a diagram illustrating an example of the plane configuration of the vibration-controlling member in FIG. 5.

FIG. 13 is a diagram illustrating an example of a plane configuration of a bonding layer or an adhesive layer in FIG. 5.

FIG. 14 is a diagram illustrating an example of the plane configuration of the bonding layer or the adhesive layer in FIG. 5.

FIG. 15 is a diagram illustrating a modification example of the cross-sectional configuration along the line A-A in FIG. 4.

FIG. 16 is a diagram illustrating an example of a plane configuration of a vibration-controlling member in FIG. 15.

FIG. 17 is a diagram illustrating an example of the plane configuration of the vibration-controlling member in FIG. 15.

FIG. 18 is a diagram illustrating an example of the plane configuration of the vibration-controlling member in FIG. 15.

FIG. 19 is a diagram illustrating a modification example of a cross-sectional configuration of a portion, of a panel in FIG. 1, corresponding to the line A-A in FIG. 4.

FIG. 20 is a diagram illustrating an example of a plane configuration of the vibration-controlling member and a sound-spreading adjustment layer in FIG. 19.

FIG. 21 is a diagram illustrating an example of the plane configuration of the vibration-controlling member and the sound-spreading adjustment layer in FIG. 19.

FIG. 22 is a diagram illustrating an example of the plane configuration of the vibration-controlling member and the sound-spreading adjustment layer in FIG. 19.

FIG. 23 is a diagram illustrating an example of the plane configuration of the vibration-controlling member and the sound-spreading adjustment layer in FIG. 19.

FIG. 24 is a diagram illustrating an example of the plane configuration of the vibration-controlling member and the sound-spreading adjustment layer in FIG. 19.

FIG. 25 is a diagram illustrating an example of the plane configuration of the vibration-controlling member and the sound-spreading adjustment layer in FIG. 19.

FIG. 26 is a diagram illustrating an example of the plane configuration of the vibration-controlling member and the sound-spreading adjustment layer in FIG. 19.

FIG. 27 is a diagram illustrating an example of the plane configuration of the vibration-controlling member and the sound-spreading adjustment layer in FIG. 19.

FIG. 28 is a diagram illustrating an example of the plane configuration of the vibration-controlling member and the sound-spreading adjustment layer in FIG. 19.

FIG. 29 is a diagram illustrating an example of the plane configuration of the vibration-controlling member and the sound-spreading adjustment layer in FIG. 19.

FIG. 30 is a diagram illustrating an example of the plane configuration of the vibration-controlling member and the sound-spreading adjustment layer in FIG. 19.

FIG. 31 is a diagram illustrating an example of the plane configuration of the vibration-controlling member and the sound-spreading adjustment layer in FIG. 19.

FIG. 32 is a diagram illustrating an example of the plane configuration of the vibration-controlling member in FIG. 19.

FIG. 33 is a diagram illustrating an example of a plane configuration of the display cell in FIG. 5.

FIG. 34 is a diagram illustrating an example of the plane configuration of the display cell in FIG. 5.

FIG. 35 is a diagram illustrating a modification example of the cross-sectional configuration of the portion, of the panel in FIG. 1, that corresponds to the line A-A in FIG. 4.

FIG. 36 is a diagram illustrating an example of a sealing film provided on the panel.

FIG. 37 is a diagram illustrating an example of the side configuration of the display apparatus at a time when a support is omitted.

FIG. 38 is a diagram illustrating an example of a rear configuration of the display apparatus in FIG. 37.

MODES FOR CARRYING OUT THE INVENTION

In the following, embodiments of the present disclosure are described in detail with reference to drawings. The following description is a specific example of the present disclosure, and the present disclosure is not limited to the following modes.

1. EMBODIMENT

[Configuration]

A display apparatus 1 according to an embodiment of the present disclosure is described. FIG. 1 illustrates an example of a side configuration of the display apparatus 1 according to the present embodiment. FIG. 2 illustrates an example of a rear configuration of the display apparatus 1 in FIG. 1. The display apparatus 1 displays an image in an image display surface 10A and also outputs a sound from the image display surface 10A. In other words, it can be said that the display apparatus 1 incorporates a flat-panel speaker in the image display surface 10A.

For example, the display apparatus 1 includes a panel 10 and a vibration exciting section 20. The panel 10 displays an image and also functions as a diaphragm. The vibration exciting section 20 is disposed on a rear surface of the panel 10 and causes the panel 10 to vibrate. For example, the display apparatus 1 further includes a signal processor 30 that controls the vibration exciting section 20, and a support 40 that supports the panel 10 via a pivoting section 50. The pivoting section 50 is directed to adjustment of a tilt angle of the panel 10 at a time when the rear surface of the panel 10 is supported by the support 40. For example, the pivoting section 50 includes a hinge that pivotably supports the panel 10 and the support 40.

The vibration exciting section 20 and the signal processor 30 are disposed on the rear surface of the panel 10. The panel 10 includes, on the rear-surface side of the panel 10, a rear cover 10R that protects the panel 10, the vibration exciting section 20, and the signal processor 30. For example, the rear cover 10R includes a metal plate or a resin plate having a plate shape. The rear cover 10R is joined to the pivoting section 50.

FIG. 3 illustrates an example of the rear configuration of the display apparatus 1 when the rear cover 10R is removed. FIG. 4 illustrates an example of the rear configuration of the display apparatus 1 when a circuit board 30A that controls the panel 10 is removed. The circuit board 30A corresponds to a specific example of the signal processor 30. FIG. 5 illustrates an example of a cross-sectional configuration along a line A-A in FIG. 4. FIG. 5 illustrates an example of a cross-sectional configuration of a vibration exciter 21a (actuator) that is to be described later. However, it is assumed that this cross-sectional configuration is similar to the cross-sectional configuration of other vibration exciters (for example, vibration exciters 21b and 21c (actuators)).

For example, the panel 10 includes a display cell 11 that has a thin-plate shape and displays an image, an inner plate 12 (opposing plate) opposed to the display cell 11 with an air gap 15 in between, and a back chassis 13. The inner plate 12 and the back chassis 13 may be integrated. A surface (a surface on opposite side to the vibration exciting section 20) of the display cell 11 is the image display surface 10A. For example, the panel 10 further includes a fixing member 14 between the display cell 11 and the inner plate 12.

The fixing member 14 has a function of fixing the display cell 11 and the inner plate 12 to each other and a function as a spacer maintaining the air gap 15. For example, the fixing member 14 is disposed along an outer edge of the display cell 11. For example, the fixing member 14 may have flexibility sufficient to allow an edge of the display cell 11 to behave as a free end when the display cell 11 is vibrating. For example, the fixing member 14 includes a sponge having a bonding layer on each side.

The inner plate 12 is a substrate that supports the vibration exciter 21 (21a, 21b, or 21c). For example, the inner plate 12 has an opening at a point where any of the vibration exciters 21a, 21b, and 21c is provided (hereinafter, referred to as an "opening for the vibration exciter"). For example, besides the opening for the vibration exciter, the inner plate 12 further has one or more openings (hereinafter, each referred to as an "air hole 14A"). The one or more air holes 14A each function as an air hole that mitigates variation in air pressure generated in the air gap 15 when the display cell 11 is caused to vibrate by vibration of the vibration exciters 21a, 21b, and 21c. The one or more air holes 14A are provided to so avoid the fixing member 14 and a vibration-controlling member 16 that is to be described later, as not to overlap with the fixing member 14 and the vibration-controlling member 16.

For example, the one or more air holes 14A each have a cylindrical shape. For example, the one or more air holes 14A may each have a rectangular cylindrical shape. For example, the one or more air holes 14A each have an internal diameter of about several centimeters. It is to be noted that one air hole 14A may include a number of through holes each having a small diameter as long as the one air hole 14A performs the function as the air hole.

Here, it is assumed that the two or more vibration exciters 21a, 21b, and 21c are disposed closer to a first end side (for example, an upper end side) out of a pair of end sides opposed to each other of the display cell 11. At this time, as illustrated in FIG. 4, for example, the one or more air holes 14A are disposed in a region between a second end side and the two or more vibration exciters 21a, 21b, and 21c. The second end side (for example, a lower end side) is different from the first end side (for example, the upper end side) out of the pair of end sides opposed to each other of the panel 10. In such a case, of the display cell 11, the portions where the one or more air holes 14A are provided vibrate easily. As a result, a user feels as if a sound is outputted from a region where the one or more air holes 14A are provided in the display cell 11.

In addition, in the rear surface of the display cell 11, it is preferable that the one or more air holes 14A be symmetrically disposed. In such a case, the sound is outputted from the display cell 11 equally from right and left.

The back chassis 13 has rigidity higher than that of the inner plate 12, and has a role to suppress deflection or vibration of the inner plate 12. For example, the back chassis 13 has an opening at a position opposed to the opening in the inner plate 12 (for example, the opening for the vibration exciter or the air hole 14A). Among the openings provided in the back chassis 13, an opening at the position opposed to the opening for the vibration exciter has a size that allows for insertion of any of the vibration exciters 21a, 21b, and 21c. Among the openings provided in the back chassis 13, an opening at the position opposed to the air hole 14A functions as the air hole that mitigates the variation in the air pressure that is generated in the air gap 15 when the display cell 11 is caused to vibrate by the vibration of the vibration exciters 21a, 21b, and 21c.

It is to be noted that the back chassis 13 need not have an opening that functions as the air hole. In addition, the back chassis 13 may have an opening that functions as the air hole, at a portion shifted from the position opposed to the air hole 14A in the inner plate 12. Even in such a case, when there is an air gap between the inner plate 12 and the back chassis 13, the air gap maintains the function of the air hole 14A in the inner plate 12. For example, the back chassis 13 includes a glass substrate. It is to be noted that, in place of the back chassis 13, a metal substrate or a resin substrate having rigidity equivalent to that of the back chassis 13 may be provided.

For example, the vibration exciting section 20 includes three vibration exciters 21a, 21b, and 21c. The vibration exciters 21a, 21b, and 21c have respective configurations the same as one another.

The vibration exciter 21a is disposed closer to the left when the display cell 11 is viewed from the rear. The vibration exciter 21b is disposed closer to the right when the display cell 11 is viewed from the rear. The vibration exciter 21c is disposed in the middle in a left-right direction when the display cell 11 is viewed from the rear. For example, the vibration exciters 21a, 21b, and 21c are arranged in a row in the left-right direction of the display cell 11. For example, the vibration exciters 21a, 21b, and 21c are disposed slightly closer to upper side than the middle in the upper-lower direction. For example, the vibration exciters 21a, 21b, and 21c each include a voice coil, a bobbin to wind the voice coil around, and a magnetic circuit. For example, the vibration exciters 21a, 21b, and 21c are each an actuator for a speaker that serves as a vibration source. The vibration exciters 21a, 21b, and 21c each generate drive force in the voice coil in accordance with a principle of electromagnetic action when a sound current of an electric signal flows in the voice coil. This drive force is transmitted to the display cell 11 via a vibration-transmitting member 24 that is to be described later, to generate vibration in the display cell 11 in accordance with the variation in the sound current, which causes air to vibrate. This varies sound pressure.

For example, the vibration exciting section 20 further includes a fixing section 23 and the vibration-transmitting member 24 for each of the vibration exciters 21a, 21b, and 21c.

For example, the fixing section 23 has an opening 23a through which any of the vibration exciters 21a, 21b, and 21c is inserted to be fixed. Furthermore, for example, the fixing section 23 has two or more screw holes 23b through which respective screws are to be inserted. The screws are used when the fixing section 23 is to be fixed to a protrusion 12A. For example, the vibration exciters 21a, 21b, and 21c are each fixed to the inner plate 12 by means of the fixing section 23. For example, in addition thereto, the fixing section 23 may have a heat sink function of releasing heat generated from the vibration exciters 21a, 21b, and 21c.

FIG. 6 illustrates an example of a plane configuration of the vibration-transmitting member 24 at a portion in contact with the display cell 11. For example, the vibration-transmitting member 24 is in contact with the rear surface of the display cell 11 and the bobbin in any of the vibration exciters 21a, 21b, and 21c, and is fixed to the rear surface of the display cell 11 and to the bobbin in any of the vibration exciters 21a, 21b, and 21c. The vibration-transmitting member 24 includes, at least, a member having a repelling property in a sound wave region (20 Hz or higher). For example, in a plane in contact with the display cell 11, the vibration-transmitting member 24 includes two layers (a middle layer 24a and a peripheral layer 24b) having hardness different from each other. The middle layer 24a is provided in a middle portion of the vibration-transmitting member 24. The middle layer 24a has hardness lower than that of the peripheral layer 24b, and includes, for example, double-sided tape. The middle layer 24a has a circular, elliptical, or polygonal shape, for example. The peripheral layer 24b is provided in contact with a peripheral edge of the middle layer 24a. The peripheral layer 24b has hardness higher than that of the middle layer 24a, and is formed by curing a thermosetting resin, for example. The peripheral layer 24b has a shape corresponding to the shape of the middle layer 24a, and has an annular, elliptical annular, or polygonal annular shape, for example.

Regarding the double-sided tape, the thicker the double-sided tape is, the more easily the vibration of the vibration exciters 21a, 21b, and 21c is absorbed owing to softness of the double-side tape. In addition, this easily causes a phase shift between the vibration transmitted to the display cell 11 and the vibration of the vibration exciters 21a, 21b, and 21c. Thus, the thicker the double-sided tape is, the more easily the sound quality deteriorates. Therefore, in this aspect, it follows that the thinner the double-sided tape, the better. However, as the double-sided tape is thinner, an adhesive strength of the double-sided tape tends to decrease. Thus, in a case of making the double-sided tape thinner, it is necessary that the peripheral layer 24b have an adhesive strength sufficient to prevent the vibration-transmitting member 24 from coming off the display cell 11 when the vibration exciters 21a, 21b, and 21c cause vibration. It is to be noted that, in a case of the peripheral layer 24b formed by curing the thermosetting resin, the peripheral layer 24b has an adhesive strength sufficient to prevent the vibration-transmitting member 24 from coming off the display cell 11.

In the case of the peripheral layer 24b formed by curing the thermosetting resin, for example, a current is caused to flow through the voice coil to generate heat in the voice coil and the thermosetting resin is cured with the heat, etc., thereby forming the peripheral layer 24b. In a case of the middle layer 24a including the double-sided tape, for example, a constant pulse signal is supplied to the voice coil and the voice coil is strongly pressed against the double-sided tape, etc., thereby fixing the middle layer 24a to the rear surface of the display cell 11 and to the bobbin in each of the vibration exciters 21a, 21b, and 21c.

As illustrated in FIG. 5, for example, the panel 10 includes the vibration-controlling member 16 between the display cell 11 and the inner plate 12. The vibration-controlling member 16 has a function of preventing mutual interference between the vibration generated in the display cell 11 by the vibration exciters 21a, 21b, and 21c. For example, the vibration-controlling member 16 may include a material that allows for control of reflection that takes place in the sound wave region (20 Hz or higher) against the vibration generated by the vibration exciters 21a, 21b, and 21c. In addition, for example, the vibration-controlling member 16 may include a material that is able to absorb the vibration or reverberation generated by the vibration exciters 21a, 21b, and 21c. The vibration-controlling member 16 is disposed in a gap between the display cell 11 and the inner plate 12, that is, in the air gap 15. The vibration-controlling member 16 is fixed at least to the rear surface of the display cell 11, out of the rear surface of the display cell 11 and the surface of the inner plate 12. For example, the vibration-controlling member 16 is in contact with the surface of the inner plate 12.

FIG. 7 illustrates an example of a cross-sectional configuration of the vibration-controlling member 16. For example, the vibration-controlling member 16 is a stacked body in which a bonding layer 161 (or an adhesive layer 166), a sponge layer 162, a base layer 163, a sponge layer 164, and a bonding layer 165 (or an adhesive layer 167) are stacked in this order from the display cell 11 side. The bonding layer 161 is in contact with the rear surface of the display cell 11 and fixes the vibration-controlling member 16 to the rear surface of the display cell 11. The sponge layers 162 and 164 are each a layer that provides the foregoing functions. For example, the sponge layers 162 and 164 each include a flexible member having a poor self-supporting property. At this time, the vibration-controlling member 16 includes a sponge as the flexible member having a poor self-supporting property, and further includes the adhesive layer 166 or the bonding layer 161 that fixes the sponge to the rear surface of the display cell 11.

In a case of the sponge layers 162 and 164 having high hardness, the reflection of a sound wave at the sponge layers 162 and 164 becomes stronger. Therefore, an in-plane distribution of a standing wave become non-flat, but the sound pressure tends to increase. In a case of the sponge layers 162 and 164 having low hardness, the reflection of the sound wave at the sponge layers 162 and 164 becomes weaker. Therefore, the in-plane distribution of the standing wave becomes closer to a flat state, but the sound pressure tends to decrease.

FIGS. 8 to 12 each illustrate an example of the plane configuration of the vibration-controlling member 16. Here, in the rear surface of the display cell 11, it is assumed that a position opposed to the vibration exciter 21a is a vibration excitation point 17a, a position opposed to the vibration exciter 21b is a vibration excitation point 17b, and a position opposed to the vibration exciter 21c is a vibration excitation point 17c. At this time, the vibration-controlling member 16 partitions the rear surface of the display cell 11 into a partitioned region 15a including the vibration excitation point 17a, a partitioned region 15b including the vibration excitation point 17b, and a partitioned region 15c including the vibration excitation point 17c. For example, as illustrated in FIGS. 8 to 11, the vibration-controlling member 16 may include a single member that forms the partitioned regions 15a, 15b, and 15c. For example, the vibration-controlling member 16 may include members provided separately for the respective partitioned regions 15a, 15b, and 15c. For example, in the vibration-controlling member 16, at least one of the partitioned regions 15a, 15b, and 15c may be formed by a member separate from a member forming other partitioned regions. For example, as illustrated in FIG. 12, a member forming the partitioned region 15a may include a member separate from the member forming the partitioned regions 15b and 15c.

For example, as illustrated in FIGS. 8, 9, and 10, the vibration-controlling member 16 is formed to cause each of the partitioned regions 15a, 15b, and 15c to be a space having a quadrangular shape. It is to be noted that, in a case where the display apparatus 1 includes two tweeters (high-frequency speakers), as illustrated in FIG. 10, for example, the vibration-controlling member 16 may have a configuration in which a small partitioned region 15d including a vibration excitation point 17d opposed to each tweeter is provided in each of the partitioned regions 15a and 15c. At this time, each partitioned region 15d is narrower than each of the partitioned regions 15a, 15b, and 15c.

For example, as illustrated in FIGS. 11 and 12, the vibration-controlling member 16 may have two or more protrusions 16A that protrude on the side of the vibration excitation points 17a, 17b, and 17c (or the vibration exciters 21a, 21b, and 21c). Of the vibration-controlling member 16, for example, in a portion forming the partitioned region 15a, two or more protrusions 16A that protrude on the side of the vibration excitation point 17a (or the vibration exciter 21a) are provided. In addition, of the vibration-controlling member 16, for example, in a portion forming the partitioned region 15b, two or more protrusions 16A that protrude on the side of the vibration excitation point 17b (or the vibration exciter 21b) are provided. In addition, of the vibration-controlling member 16, for example, in a portion forming the partitioned region 15c, two or more protrusions 16A that protrude on the side of the vibration excitation point 17c (or the vibration exciter 21c) are provided.

In a case where the standing wave is generated in the display cell 11, there is a possibility of causing a decrease in sound quality due to an influence of the standing wave, such as an occurrence of harshness in sound or difficulty in producing a sound in a specific frequency band. Therefore, in terms of sound quality, it is preferable to suppress the standing wave in the display cell 11. Here, in a case where the vibration-controlling member 16 includes the two or more protrusions 16A, the vibration-controlling member 16 includes a portion (hereinafter, referred to as an "outer protrusion") that protrudes on opposite side to the vibration excitation points 17a, 17b, and 17c (or the vibration exciters 21a, 21b, and 21c). For example, this outer protrusion may be bell-shaped or of a tapering convergent type. In a case where a sound wave proceeds toward this outer protrusion, the sound wave is repeatedly reflected by the outer protrusion, attenuating the vibration energy of the sound wave. As a result, the generation of the standing wave is suppressed. Therefore, in terms of suppression of the standing wave, it is preferable that the vibration-controlling member 16 include a number of protrusions 16A.

As illustrated in FIG. 12, for example, the vibration-controlling member 16 may have a configuration in which each of the vibration excitation points 17a, 17b, and 17c (or the vibration exciters 21a, 21b, and 21c) is located off a center of a corresponding one of the partitioned regions 15a, 15b, and 15c. In terms of suppression of the standing wave, it is preferable that each of the vibration excitation points 17a, 17b, and 17c (or the vibration exciters 21a, 21b, and 21c) be located off the center of the corresponding one of the partitioned regions 15a, 15b, and 15c. For example, in a case of the partitioned regions 15a, 15b, and 15c each having a rectangular shape as illustrated in FIGS. 8 to 10, the "center of each of the partitioned regions 15a, 15b, and 15c" indicates a center position in upper-lower and left-right directions in each of the partitioned regions 15a, 15b, and 15c. For example, in a case of the partitioned regions 15a, 15b, and 15c being surrounded by the two or more protrusions 16A as illustrated in FIGS. 11 and 12, the "center of each of the partitioned regions 15a, 15b, and 15c" indicates a point of intersection of a center line of a shortest distance in the upper-lower direction and a center line of a shortest distance in the left-right direction in each of the partitioned regions 15a, 15b, and 15c.

For example, as illustrated in FIGS. 8 to 12, the vibration-controlling member 16 may be so formed that each of the partitioned regions 15a, 15b, and 15c is a closed region in the rear surface of the display cell 11. For example, the vibration-controlling member 16 may be so formed that the partitioned regions 15a, 15b, and 15c are communicated with one another while being partitioned from one another in the rear surface of the display cell 11.

For example, as illustrated in FIGS. 8, 10, 11, and 12, in the vibration-controlling member 16, the partitioned regions 15a and 15b on right and left sides may each have a size smaller than the size of the partitioned region 15c in the middle. In the case where the partitioned regions 15a and 15b on the right and left sides each have the size smaller than the partitioned region 15c in the middle, the vibration of the vibration exciter 21c makes it easier to output a low-tone range while making it more difficult to output a high-tone range from the middle portion of the display cell 11. Furthermore, the vibration of the vibration exciters 21a and 21b makes it easier to output a high-tone range while making it more difficult to output a low-tone range from portions on the right and left sides of the display cell 11.

For example, as illustrated in FIG. 9, in the vibration-controlling member 16, the partitioned regions 15a and 15b on the right and left sides may each have a size larger than the size of the partitioned region 15b in the middle. In the case where the partitioned regions 15a and 15b on the right and left sides each have a size larger than the size of the partitioned region 15c in the middle, the vibration of the vibration exciter 21c makes it easier to output a high-tone sound while making it more difficult to output a low-tone range from the middle portion of the display cell 11. Furthermore, the vibration of the vibration exciters 21a and 21b makes it easier to output a low-tone range while making it more difficult to output a high-tone range from the right and left sides of the display cell 11

As illustrated in FIG. 5, for example, the panel 10 further includes a bonding layer 18 or an adhesive layer 19 that is disposed between the inner plate 12 and the back chassis 13. The bonding layer 18 or the adhesive layer 19 is a layer directed to fixing of the inner plate 12 and the back chassis 13 to each other.

The bonding layer 18 or the adhesive layer 19 has a function of preventing mutual interference between the vibration generated in the display cell 11 by the two vibration exciters 21a and 21b adjacent to each other. Furthermore, the bonding layer 18 or the adhesive layer 19 has a function of preventing mutual interference between the vibration generated in the display cell 11 by the two vibration exciters 21b and 21c adjacent to each other.

For example, the bonding layer 18 or the adhesive layer 19 may include a material that allows for control of the reflection that takes place in the sound wave region (20 Hz or higher) against the vibration generated by the vibration exciters 21a, 21b, and 21c. In addition, for example, the bonding layer 18 or the adhesive layer 19 may include a material that is able to absorb the vibration or reverberation generated by the vibration exciters 21a, 21b, and 21c.

FIGS. 13 and 14 each illustrate an example of a plane configuration of the bonding layer 18 or the adhesive layer 19. The bonding layer 18 or the adhesive layer 19 partitions a rear surface of the inner plate 12 into a partitioned region 18a (19a) opposed to the partitioned region 15a, a partitioned region 18b (19b) opposed to the partitioned region 15b, and a partitioned region 18c (19c) opposed to the partitioned region 15c. For example, the bonding layer 18 or the adhesive layer 19 may include a single member that forms the partitioned regions 18a (19a), 18b (19b), and 18c (19c). For example, the bonding layer 18 or the adhesive layer 19 may include members provided separately for the respective partitioned regions 18a (19a), 18b (19b), and 18c (19c). For example, in the bonding layer 18 or the adhesive layer 19, at least one of the partitioned regions 18a (19a), 18b (19b), and 18c (19c) may be formed by a member separate from a member forming other partitioned regions. For example, as illustrated in FIG. 13, a member forming the partitioned region 18a (19a) may include a member separate from the members forming the partitioned regions 18b (19b) and 18c (19c).

For example, the bonding layer 18 or the adhesive layer 19 is provided to cause each of the partitioned regions 18a (19a), 18b (19b), and 18c (19c) to be a space having a quadrangular shape. As illustrated in FIG. 13, for example, the bonding layer 18 or the adhesive layer 19 may have two or more protrusions 18A (19A) that protrude on the side of the vibration excitation points 17a, 17b, and 17c (or the vibration exciters 21a, 21b, and 21c). Of the bonding layer 18 or the adhesive layer 19, for example, in a portion forming the partitioned region 18a (19a), two or more protrusions 18A (19A) that protrude on the side of the vibration excitation point 17a (the vibration exciter 21a) are provided. In addition, of the bonding layer 18 or the adhesive layer 19, for example, in a portion forming the partitioned region 18b (19b), two or more protrusions 18A (19A) that protrude on the side of the vibration excitation point 17b (the vibration exciter 21b) are provided. In addition, of the bonding layer 18 or the adhesive layer 19, in a portion forming the partitioned region 18c (19c), for example, two or more protrusions 18A (19A) that protrude on the side of the vibration excitation point 17c (the vibration exciter 21c) are provided. In terms of suppression of the standing wave, it is preferable that the bonding layer 18 or the adhesive layer 19 have a number of protrusions 18A (19A). There is a possibility of causing a decrease in sound quality due to the influence of the standing wave generated in the display cell 11, such as an occurrence of harshness in sound or difficulty in producing a sound in a specific frequency band. Therefore, in terms of sound quality, it is preferable to suppress the standing wave in the display cell 11.

As a result of providing the two or more protrusions 18A (19A), the bonding layer 18 or the adhesive layer 19 is to include a portion (hereinafter, referred to as an "outer protrusion") that protrudes on the opposite side to the vibration excitation points 17a, 17b, and 17c (the vibration exciters 21a, 21b, and 21c). For example, this outer protrusion may be bell-shaped or of a tapering convergent type. In terms of suppression of the standing wave, it is preferable that this outer protrusion be of the tapering convergent type.

In terms of suppression of the standing wave, as illustrated in FIG. 5, for example, it is preferable that the bonding layer 18 or the adhesive layer 19 be disposed at a position opposed to the vibration-controlling member 16. In a case where the vibration-controlling member 16 has a shape including two or more protrusions 16A as illustrated in FIG. 12, the bonding layer 18 or the adhesive layer 19 has a shape including two or more protrusions 18A (19A) as illustrated in FIG. 13, for example, and may also be disposed at a position opposed to the vibration-controlling member 16.

[Effects]

Next, effects of the display apparatus 1 according to the present embodiment are described.

A decrease in thickness and weight of a display has been progressing rapidly. Along with this, a decrease in thickness and weight of a speaker has also been progressing, and it is proposed to use a flat-panel speaker (FPS) in place of a cone-type speaker. Furthermore, it is also proposed to use a display panel as a diaphragm in the flat-panel speaker. In a field of the flat-panel speaker, further improvement in sound quality is expected.

Meanwhile, in the display apparatus 1 according to the present embodiment, the inner plate 12 provided to be opposed to the display cell 11 with the air gap 15 in between includes one or more air holes 14A that mitigate the variation in the air pressure that is generated in the air gap 15 when the display cell 11 is caused to vibrate by the vibration of the vibration exciters 21a, 21b, and 21c. Thereby, when the two or more vibration exciters 21a, 21b, and 21c vibrate, in accordance with the vibration, the air in the air gap 15 is discharged to the outside via the one or more air holes 14A or the outside air flows into the air gap 15 via the one or more air holes 14A. Thus, in the present embodiment, as compared to the case of not providing the air hole 14A in the inner plate 12, the variation in the air pressure generated in the air gap 15 is suppressed. As a result, it is possible to prevent the vibration of the display cell 11 as a diaphragm from being suppressed by the air pressure generated in the air gap 15. This accordingly makes it possible to improve sound quality in the low-tone range.

In addition, in the present embodiment, in a case where the two or more vibration exciters 21a, 21b, and 21c are disposed closer to the first end side (for example, the upper end side) out of a pair of end sides opposed to each other of the display cell 11, the one or more air holes 14A are disposed in the region between the second end side (for example, the lower end side) that is different from the first end side and the two or more vibration exciters 21a, 21b, and 21c. This causes the portion, of the display cell 11, that has the one or more air holes 14A to vibrate more easily. As a result, a user feels as if a sound is outputted from the portion, of the display cell 11, that has the one or more air holes 14A. Thus, in the present embodiment, it is possible to control the position from which the user feels the sound is outputted by means of the one or more air holes 14A. This accordingly makes it possible to generate a desired sound image that does not depend on a restriction on the position of each of the vibration exciters 21a, 21b, and 21c.

2. MODIFICATION EXAMPLES

Next, modification examples of the display apparatus 1 according to the foregoing embodiment are described.

Modification Example A

In the display apparatus 1 according to the foregoing embodiment, as illustrated in FIG. 15, for example, the panel 10 may include two or more vibration exciters 21 for each of the partitioned regions 15a, 15b, and 15c. In the present modification example, for example, the panel 10 may include two or more (for example, two) vibration exciters 21a in the partitioned region 15a. Likewise, in the display apparatus 1 according to the foregoing embodiment, the panel 10 may include two or more (for example, two) vibration exciters 21b in the partitioned region 15b. Likewise, in the display apparatus 1 according to the foregoing embodiment, the panel 10 may include two or more (for example, two) vibration exciters 21c in the partitioned region 15c.

At this time, as illustrated in FIGS. 16, 17, and 18, for example, the two or more vibration excitation points 17 corresponding to the two or more vibration exciters 21 are arranged in a row in each of the partitioned regions 15a, 15b, and 15c. Here, as illustrated in FIG. 16, for example, the two or more vibration excitation points 17 are arranged in each of the partitioned regions 15a, 15b, and 15c in the upper-lower direction of the display cell 11. As illustrated in FIG. 17, for example, the two or more vibration excitation points 17 may be arranged in each of the partitioned regions 15a, 15b, and 15c in the left-right direction of the display cell 11. As illustrated in FIG. 18, for example, the two or more vibration excitation points 17 may be arranged in each of the partitioned regions 15a and 15b in the upper-lower direction of the display cell 11 while being arranged in the partitioned region 15c in the left-right direction of the display cell 11.

In a case where the two or more vibration excitation points 17 are arranged in the upper-lower direction of the display cell 11, it becomes easier for a sound to spread in a direction (the left-right direction of the display cell 11) orthogonal to an arrangement direction of the two or more vibration excitation points 17 (the upper-lower direction of the display cell 11). In addition, in a case where the two or more vibration excitation points 17 are arranged in the left-right direction of the display cell 11, it becomes easier for a sound to spread in a direction (the upper-lower direction of the display cell 11) orthogonal to the arrangement direction of the two or more vibration excitation points 17 (the left-right direction of the display cell 11).

In addition, in the present modification example, the two or more vibration exciters 21 (or the two or more vibration excitation points 17) may be disposed, in each of the partitioned regions 15a, 15b, and 15c, at positions greatly shifted from a vicinity of the center of each of the partitioned regions 15a, 15b, and 15c.

For example, in the present modification example, the two or more vibration exciters 21 (or the two or more vibration excitation points 17) may be disposed near the upper end side of the display cell 11, in each of the partitioned regions 15a, 15b, and 15c. Thus, in a case where the two or more vibration exciters 21 (or the two or more vibration excitation points 17) are disposed close to a portion, of the vibration-controlling member 16, near the upper end side of the display cell 11, the sound generated by the vibration of the two or more vibration excitation points 17 does not spread to upper side of the display cell 11, but spreads to lower side of the display cell 11. Therefore, even in the case where the two or more vibration exciters 21 (or the two or more vibration excitation points 17) are disposed close to the portion, of the vibration-controlling member 16, near the upper end side of the display cell 11, the user is allowed to feel as if the sound is produced in the vicinity of the middle in the upper-lower direction of the display cell 11.

Modification Example B

In the display apparatus 1 according to the foregoing modification example A, as illustrated in FIG. 19, for example, the panel 10 may further include a sound-spreading adjustment layer 25 (sound-spreading amount adjustment member) between the display cell 11 and the vibration-transmitting member 24. The sound-spreading adjustment layer 25 covers, out of the rear surface of the display cell 11, a region including each vibration excitation point 17. The sound-spreading adjustment layer 25 is bonded to the display cell 11 in order to locally enhance rigidity of the portion including each vibration excitation point 17, of the display cell 11. The sound-spreading adjustment layer 25 locally enhances the rigidity of the portion including each vibration excitation point 17, of the display cell 11, thereby controlling the spreading of the sound generated by the vibration of the display cell 11. For example, the sound-spreading adjustment layer 25 includes sheet-like aluminum or stainless steel, and a member that bonds or adheres the display cell 11 and the sheet-like aluminum or stainless steel to each other. In the case where the sound-spreading adjustment layer 25 includes the sheet-like aluminum or stainless steel, and the member that bonds or adheres the display cell 11 and the sheet-like aluminum or stainless steel to each other, the sound-spreading adjustment layer 25 has a thickness of about 0.15 mm, for example.

As illustrated in FIGS. 20, 21, 22, 23, 24, and 25, for example, the sound-spreading adjustment layer 25 is provided one for each of the partitioned regions 15a, 15b, and 15c. As illustrated in FIGS. 20, 21, 22, 23, 24, and 25, for example, each sound-spreading adjustment layer 25 has a belt-like shape that extends in a predetermined direction in each of the partitioned regions 15a, 15b, and 15c. The shape of the sound-spreading adjustment layer 25 is not limited to the belt-like shape (rectangular), and is sufficient to be a shape having different dimensions including long and short sides. The sound-spreading adjustment layer 25 may have an elliptical or diamond shape, for example. In a case where the sound-spreading adjustment layer 25 has a rectangular or diamond shape, the sound-spreading adjustment layer 25 may have a sharp corner or a rounded corner.

It is assumed that the two or more vibration excitation points 17 (17a, 17b, and 17c) are arranged in each of the partitioned regions 15a, 15b, and 15c in the upper-lower direction of the display cell 11. In this case, as illustrated in FIG. 20, for example, each sound-spreading adjustment layer 25 has a shape that extends, in each of the partitioned regions 15a, 15b, and 15c, in the arrangement direction of the vibration excitation points 17 (17a, 17b, and 17c) (the upper-lower direction of the display cell 11). At this time, each sound-spreading adjustment layer 25 has a shape that extends in a direction coincident with a direction in which one or more air holes 10C are provided for each of the vibration exciters 21a, 21b, and 21c. In addition, it is assumed that the two or more vibration excitation points 17 (17a, 17b, and 17c) are arranged in each of the partitioned regions 15a, 15b, and 15c, in the left-right direction of the display cell 11. In this case, as illustrated in FIG. 21, for example, each sound-spreading adjustment layer 25 has a shape that extends, in each of the partitioned regions 15a, 15b, and 15c, in the arrangement direction of the vibration excitation points 17 (17a, 17b, and 17c) (the left-right direction of the display cell 11). At this time, each sound-spreading adjustment layer 25 has a shape that extends in a direction intersecting with (orthogonal to) the direction in which the one or more air holes 10C are provided with respect to each of the vibration exciters 21a, 21b, and 21c.

It is assumed that the two or more vibration excitation points 17 (17a, 17b, and 17c) are arranged in each of the partitioned regions 15a, 15b, and 15c, in the upper-lower direction of the display cell 11. In this case, as illustrated in FIG. 22, for example, each sound-spreading adjustment layer 25 has a shape that extends, in each of the partitioned regions 15a, 15b, and 15c, in a direction (the left-right direction of the display cell 11) orthogonal to the arrangement direction of the vibration excitation points 17 (17a, 17b, and 17c). At this time, each sound-spreading adjustment layer 25 has a shape that extends in a direction intersecting with (orthogonal to) the direction in which the one or more air holes 10C are provided with respect to each of the vibration exciters 21a, 21b, and 21c. It is assumed that the two or more vibration excitation points 17 (17a, 17b, and 17c) are arranged in each of the partitioned regions 15a, 15b, and 15c, in the left-right direction of the display cell 11. In this case, as illustrated in FIG. 23, for example, each sound-spreading adjustment layer 25 has a shape that extends, in each of the partitioned regions 15a, 15b, and 15c, in a direction (the upper-lower direction of the display cell 11) orthogonal to the arrangement direction of the vibration excitation points 17 (17a, 17b, and 17c). At this time, each sound-spreading adjustment layer 25 has a shape that extends in a direction coincident with the direction in which the one or more air holes 10C are provided with respect to each of the vibration exciters 21a, 21b, and 21c.

It is assumed that the two or more vibration excitation points 17 (17a, 17b, and 17c) are arranged in each of the partitioned regions 15a, 15b, and 15c, in the upper-lower direction of the display cell 11. In this case, as illustrated in FIG. 24, for example, each sound-spreading adjustment layer 25 has a shape that extends, in each of the partitioned regions 15a and 15b, in a direction (the left-right direction of the display cell 11) obliquely intersecting with the arrangement direction of the vibration excitation points 17. For example, the sound-spreading adjustment layer 25 in the partitioned region 15a has a shape that extends from a vicinity of the middle of the upper end side of the display cell 11 toward a vicinity of a left end of the lower end side of the display cell 11. At this time, the sound-spreading adjustment layer 25 in the partitioned region 15a has a shape that extends in a direction obliquely intersecting with the direction in which the one or more air holes 10C are provided with respect to the vibration exciter 21a. For example, the sound-spreading adjustment layer 25 in the partitioned region 15b has a shape that extends from the vicinity of the middle of the upper end side of the display cell 11 toward the vicinity of a right end of the lower end side of the display cell 11. At this time, the sound-spreading adjustment layer 25 in the partitioned region 15b has a shape that extends in a direction obliquely intersecting with the direction in which the one or more air holes 10C are provided for the vibration exciter 21b. For example, the sound-spreading adjustment layer 25 in the partitioned region 15c has a shape that extends in the arrangement direction of the vibration excitation points 17 (17a, 17b, and 17c) (the upper-lower direction of the display cell 11). At this time, the sound-spreading adjustment layer 25 in the partitioned region 15c has a shape that extends in a direction coincident with the direction in which the one or more air holes 10C are provided with respect to the vibration exciter 21c.

It is assumed that the two or more vibration excitation points 17 (17a and 17b) are arranged in each of the partitioned regions 15a and 15b, in the upper-lower direction of the display cell 11. Furthermore, it is assumed that the two or more vibration excitation points 17 (17c) are arranged in the partitioned region 15c, in the left-right direction of the display cell 11. In this case, as illustrated in FIG. 25, for example, the sound-spreading adjustment layer 25 in each of the partitioned regions 15a and 15b has a shape that extends in a direction (the left-right direction of the display cell 11) orthogonal to the arrangement direction of the vibration excitation points 17 (17a and 17b). At this time, the sound-spreading adjustment layer 25 in each of the partitioned regions 15a and 15b has a shape that extends in a direction intersecting with (orthogonal to) the direction in which the one or more air holes 10C are provided with respect to each of the vibration exciters 21a and 21b. As illustrated in FIG. 25, for example, the sound-spreading adjustment layer 25 in the partitioned region 15c has a shape that extends in a direction (the upper-lower direction of the display cell 11) orthogonal to the arrangement direction of the vibration excitation points 17 (17c). At this time, the sound-spreading adjustment layer 25 in the partitioned region 15c has a shape that extends in a direction coincident with the direction in which the one or more air holes 10C are provided with respect to the vibration exciter 21c.

Thus, in the present modification example, adjustment of an extending direction of the sound-spreading adjustment layer 25 makes it possible to control a direction of sound spreading. Providing the sound-spreading adjustment layer 25 results in a greater sound spreading in the extending direction of the sound-spreading adjustment layer 25.

In a case where the extending direction of the sound-spreading adjustment layer 25 is made orthogonal to the arrangement direction of each of the vibration exciters 21a, 21b, and 21c, it is possible to spread the sound more greatly in the extending direction of the sound-spreading adjustment layer 25. In addition, in a case where the direction of the sound spreading by the sound-spreading adjustment layer 25 is made coincident with the arrangement direction of each of the vibration exciters 21a, 21b, and 21c, it is possible to greatly spread the sound in the upper-lower and left-right directions.

In a case where the extending direction of the sound-spreading adjustment layer 25 is made coincident with the direction in which the one or more air holes 10C are provided with respect to each of the vibration exciters 21a, 21b, and 21c, it is possible to spread the sound further greatly in the direction. In addition, in a case where the extending direction of the sound-spreading adjustment layer 25 is caused to intersect with (made orthogonal to) the direction in which the one or more air holes 10C are provided with respect to each of the vibration exciters 21a, 21b, and 21c, it is possible to further widen an angle range in which the sound is spread.

Thus, in the present modification example, adjustment of the extending direction of the sound-spreading adjustment layer 25, the arrangement direction of each of the vibration exciters 21a, 21b, and 21c, and the direction in which the one or more air holes 10C are provided with respect to each of the vibration exciters 21a, 21b, and 21c makes it possible to generate a desired sound image.

Modification Example C

In the foregoing modification example B, the signal processor 30 may control the two or more vibration exciters 21 (21a, 21b, and 21c) for each of the partitioned regions 15a, 15b, and 15c. In this case, for example, the signal processor 30 outputs a common sound signal (for example, an L-signal) to the two or more vibration exciters 21a provided in the partitioned region 15a. In addition, for example, the signal processor 30 outputs a common sound signal (for example, an R-signal) to the two or more vibration exciters 21b provided in the partitioned region 15b. In addition, for example, the signal processor 30 outputs a common sound signal (for example, a C-signal) to the two or more vibration exciters 21c provided in the partitioned region 15c.

Modification Example D

In the foregoing modification example C, each sound-spreading adjustment layer 25 may have a square shape. In this case, in each of the partitioned regions 15a, 15b, and 15c, the two or more vibration exciters 21 (21a, 21b, and 21c) may be disposed at respective biased positions in a region opposed to the sound-spreading adjustment layer 25.

In the partitioned region 15a, as illustrated in FIG. 26, for example, the two or more vibration exciters 21a may be disposed at respective positions biased to the right in the region opposed to the sound-spreading adjustment layer 25. In such a case, as compared to the case of omitting the sound-spreading adjustment layer 25, it is possible to expand the sound image to the left. In addition, in the partitioned region 15b, as illustrated in FIG. 26, for example, the two or more vibration exciters 21b may be disposed at respective positions biased to lower left in the region opposed to the sound-spreading adjustment layer 25. In such a case, as compared to the case of omitting the sound-spreading adjustment layer 25, it is possible to expand the sound image to upper right. In addition, in the partitioned region 15c, as illustrated in FIG. 26, for example, the two or more vibration exciters 21c may be disposed at respective positions biased upward in the region opposed to the sound-spreading adjustment layer 25. In such a case, as compared to the case of omitting the sound-spreading adjustment layer 25, it is possible to expand the sound image downward.

Modification Example E

In the foregoing modification example C, the sound-spreading adjustment layer 25 may extend across two or more partitioned regions 115. As illustrated in FIG. 27, for example, the sound-spreading adjustment layer 25 may extend across three partitioned regions 115 (15a, 15b, and 15c). In such a case, as compared to the case of providing the sound-spreading adjustment layer 25 separately for each partitioned region 15, it is possible to improve linkage of the sound images generated for the respective partitioned regions 115.

Modification Example F

In the foregoing modification example C, the signal processor 30 may control, in each partitioned region 115, the two or more vibration exciters 21 for each group when dividing the vibration exciters 21 into two or more groups.

In other words, in each partitioned region 115, the sound-spreading adjustment layer 25 common in each group may be provided.

In this case, as illustrated in FIG. 28, for example, the signal processor 30 may output a common sound signal common in each group when dividing the two or more vibration exciters 21a provided in the partitioned region 15a into two groups g1 and g2. In other words, in the partitioned region 15a, the sound-spreading adjustment layer 25 common to the two groups g1 and g2 may be provided. At this time, there may be a predetermined gap between the group g1 and the group g2.

In addition, as illustrated in FIG. 28, for example, the signal processor 30 may output a common sound signal to each group when dividing the two or more vibration exciters 21b provided in the partitioned region 15b into two groups g3 and g4. In other words, in the partitioned region 15b, the sound-spreading adjustment layer 25 common to the two groups g3 and g4 may be provided. At this time, there may be a predetermined gap between the group g3 and the group g4.

In addition, as illustrated in FIG. 28, for example, the signal processor 30 may output a common sound signal to each group when dividing the two or more vibration exciters 21c provided in the partitioned region 15c into two groups g5 and g6. In other words, in the partitioned region 15c, the sound-spreading adjustment layer 25 common to the two groups g5 and g6 may be provided. At this time, there may be a predetermined gap between the group g5 and the group g6.

In such a case, it is possible to improve a problem of sound separation in each partitioned region 115.

It is to be noted that, in each of the groups g1 to g6, two or more vibration exciters 21 may be provided as illustrated in FIG. 28, for example, or one vibration exciter 21 may be provided as illustrated in FIG. 29, for example. In addition, in each partitioned region 115, as illustrated in FIGS. 28 and 29, for example, two or more groups may be disposed to be opposed to each other in the upper-lower direction, or as illustrated in FIGS. 30 and 31, for example, the two or more groups may be disposed to be opposed to each other in the left-right direction. In a case where the two or more groups are disposed to be opposed to each other in the upper-lower direction, the sound-spreading adjustment layer 25 may extend in the upper-lower direction as illustrated in FIGS. 28 and 29, for example. In such a case, in each partitioned region 115, it is possible to improve sound separation in the upper-lower direction. In a case where the two or more groups are disposed to be opposed to each other in the left-right direction, the sound-spreading adjustment layer 25 may extend in the left-right direction as illustrated in FIGS. 30 and 31, for example. In such a case, in each partitioned region 115, it is possible to improve sound separation in the left-right direction.

Modification Example G

In the foregoing embodiment and the modification examples A to F thereof, as illustrated in FIG. 32, for example, the vibration-controlling member 16 may have one or more air holes 16H through which air passes. At this time, the one or more air holes 16H may be provided in place of the air holes 10C, or may be provided along with the air holes 10C. In such a case, when the two or more vibration exciters 21a, 21b, and 21c vibrate, in accordance with the vibration, the air in the air gap 15 is discharged to the outside via the one or more air holes 16H, or the outside air flows into the air gap 15 via the one or more air holes 16H. Thus, in the present modification example, as compared to the case where the air hole 16H is not provided in the vibration-controlling member 16, the variation in the air pressure generated in the air gap 15 is suppressed. As a result, it is possible to prevent the vibration of the display cell 11 as a diaphragm from being suppressed by the air pressure generated in the air gap 15. This accordingly makes it possible to improve sound quality in the low-tone range.

Modification Example H

In the foregoing embodiment and the modification examples A to G thereof, as illustrated in FIG. 33, for example, the display cell 11 may include two or more display cells 11A. In this case, the display cell 11 may have a gap 11B through which the air passes, between two display cells 11A adjacent to each other. At this time, the gap 11B may be provided in place of the air hole 10C or the air hole 16H, or may be provided along with the air hole 10C or the air hole 16H. In such a case, when the two or more vibration exciters 21a, 21b, and 21c vibrate, in accordance with the vibration, the air in the air gap 15 is discharged to the outside via the one or more gaps 11B, or the outside air flows into the air gap 15 via the one or the two or more gaps 11B. Thus, in the present modification example, as compared to the case where the gap 11B is not provided in the display cell 11, the variation in the air pressure generated in the air gap 15 is suppressed. As a result, it is possible to prevent the vibration of the display cell 11 as a diaphragm from being suppressed by the air pressure generated in the air gap 15. This accordingly makes it possible to improve sound quality in the low-tone range.

Modification Example I

In the foregoing embodiment and the modification examples A to G thereof, as illustrated in FIG. 34, for example, the display cell 11 may include one or more air holes 11C. At this time, the air hole 11C may be provided in place of the air hole 10C or the air hole 16H, or may be provided along with the air hole 10C or the air hole 16H. In such a case, when the two or more vibration exciters 21a, 21b, and 21c vibrate, in accordance with the vibration, the air in the air gap 15 is discharged to the outside via the one or more air holes 11C, or the outside air flows into the air gap 15 via the one or more air holes 11C. Thus, in the present modification example, as compared to the case where the air hole 11C is not provided in the display cell 11, the variation in the air pressure generated in the air gap 15 is suppressed. As a result, it is possible to prevent the vibration of the display cell 11 as a diaphragm from being suppressed by the air pressure generated in the air gap 15. This accordingly makes it possible to improve sound quality in the low-tone range.

Modification Example J

In the foregoing modification examples B to I, as illustrated in FIG. 35, for example, in place of the sound-spreading adjustment layer 25, a sound-spreading adjuster 26 may be provided. The sound-spreading adjuster 26 is a partially thickened portion, of the rear surface of the display cell 11, at which the sound-spreading adjustment layer 25 is provided. The sound-spreading adjuster 26 indicates a protrusion, of the display cell 11, that protrudes in the rear surface of the display cell 11, on the side of the inner plate 12. As with the sound-spreading adjustment layer 25, the sound-spreading adjuster 26 is intended to locally enhance the rigidity of a portion including each vibration excitation point 17, of the display cell 11. The sound-spreading adjuster 26 locally enhances the rigidity of the portion including each vibration excitation point 17, of the display cell 11, thereby controlling the spreading of the sound generated by the vibration of the display cell 11.

For example, the sound-spreading adjuster 26 is formed being integrated with the rear surface of the display cell 11. In a case where the rear surface of the display cell 11 includes metal, for example, the sound-spreading adjuster 26 includes the same material (that is, metal) as the rear surface of the display cell 11. At this time, for example, the rear surface of the display cell 11 and the sound-spreading adjuster 26 include stainless steel or metal having a strength equivalent to or higher than stainless steel. In a case where the rear surface of the display cell 11 includes resin, for example, the sound-spreading adjuster 26 includes the same material (that is, resin) as the rear surface of the display cell 11.

For example, the sound-spreading adjuster 26 is provided one for each of the partitioned regions 15a, 15b, and 15c. For example, the sound-spreading adjuster 26 has a belt-like shape that extends in a predetermined direction in each of the partitioned regions 15a, 15b, and 15c. The shape of the sound-spreading adjuster 26 is not limited to the belt-like shape (rectangular), but is sufficient to be a shape having different dimensions including long and short sides. The sound-spreading adjuster 26 may have an elliptical or diamond shape, for example. In a case where the sound-spreading adjuster 26 has a rectangular or diamond shape, the sound-spreading adjuster 26 may have a sharp corner or a rounded corner.

In the present modification example, as with the sound-spreading adjustment layer 25, adjustment of an extending direction of the sound-spreading adjuster 26 makes it possible to control the direction of sound spreading. Providing the sound-spreading adjuster 26 results in greater sound spreading in the extending direction of the sound-spreading adjuster 26. Accordingly, in the present modification example, adjustment of the extending direction of the sound-spreading adjuster 26, the arrangement direction of each of the vibration exciters 21a, 21b, and 21c, and the direction in which the one or more air holes 10C are provided with respect to each of the vibration exciters 21a, 21b, and 21c makes it possible to generate a desired sound image.

Modification Example K

In the foregoing modification examples C to J, the one or more air holes 10C may be omitted. Even in such a case, in the present modification example, adjustment of the extending direction of the sound-spreading adjustment layer 25 or the sound-spreading adjuster 26, and the arrangement direction of each of the vibration exciters 21a, 21b, and 21c makes it possible to generate a desired sound image.

Modification Example L

In the foregoing embodiment and the modification examples A to K thereof, as illustrated in FIG. 36, for example, the panel 10 may have a flexible sealing film 10D that seals at least one of the air hole 14A, the air hole 14C, the air hole 16H, the gap 11B, and the air hole 11C. Here, when the two or more vibration exciters 21a, 21b, and 21c vibrate, the sealing film 10D is configured to mitigate the variation in the air pressure that is generated in the air gap 15 in accordance with the vibration. For example, the sealing film 10D includes a thin resin film that is displaced in accordance with the variation in the air pressure in the air gap 15. Thus, in the present modification example, as compared with the case where the air hole 14A, the air hole 14C, the air hole 16H, the gap 11B, or the air hole 11C is not provided, the variation in the air pressure generated in the air gap 15 is suppressed. As a result, it is possible to prevent the vibration of the display cell 11 as a diaphragm from being suppressed by the air pressure generated in the air gap 15. This accordingly makes it possible to improve sound quality in the low-tone range. Furthermore, it is possible to prevent dust and so on from coming in from outside by means of the sealing film 10D.

Modification Example M

In the foregoing embodiment and the modification examples A to K thereof, as illustrated in FIGS. 37 and 38, for example, the support 40 and the pivoting section 50 may be omitted. However, in this case, it is preferable to provide, in the rear cover 10R, a recess 32 with which the display apparatus 1 according to the foregoing embodiment and the modification examples thereof is to be hung on a hook provided on a wall or the like. It is to be noted that in a case of placing the display apparatus 1 according to the foregoing embodiment and the modification examples thereof on a table-top stand, it is not necessary to provide the foregoing recess 32.

Although the present disclosure has been described above with reference to the embodiment and the modification examples thereof, the present disclosure is not limited to the above-described embodiments, etc., and various modifications are possible. It is to be noted that effects described in the present specification is merely illustrative. The effects of the present disclosure are not limited to the effects described in the present specification. The present disclosure may have any effect other than the effects described in the present specification.

In addition, for example, the present disclosure may have the following configurations.

(1)
A display apparatus, including:
a display cell that displays an image, the display cell having a thin-plate shape;
two or more vibration exciters disposed on rear-surface side of the display cell, the two or more vibration exciters causing the display cell to vibrate;
an opposing plate opposed to the display cell with an air gap in between, the opposing plate supporting the two or more vibration exciters; and
a sound-spreading adjustment member disposed between the display cell and the two or more vibration exciters, the sound-spreading adjustment member controlling spreading of a sound generated by vibration caused by the two or more vibration exciters.

(2)
The display apparatus according to (1), in which
the two or more vibration exciters are arranged in an upper-lower direction or a left-right direction of the display cell, and
the sound-spreading adjustment member has a shape that extends in an arrangement direction of the two or more vibration exciters, a direction orthogonal to the arrangement direction of the two or more vibration exciters, or a direction intersecting with the arrangement direction of the two or more vibration exciters.

(3)
The display apparatus according to (1), in which
the sound-spreading adjustment member has a square shape, and
the two or more vibration exciters are disposed at respective biased positions within a region opposed to the sound-spreading adjustment member.

(4)
The display apparatus according to any one of (1) to (3), further including
a signal processor that controls the two or more vibration exciters on a group basis when the two or more vibration exciters are divided into two or more groups, in which
the sound-spreading adjustment member is provided common to each of the groups.

(5)
The display apparatus according to any one of (1) to (3), in which
the opposing plate has one or more first air holes that mitigate variation in air pressure, the air pressure being generated in the air gap when the display cell is caused to vibrate by vibration of one or more vibration exciters, and
the sound-spreading adjustment member has a shape that extends in a direction coincident with, in a direction orthogonal to, or in a direction intersecting with a direction in which the one or more first air holes are provided with respect to each of the vibration exciters.

(6)
The display apparatus according to any one of (1) to (5), further including
a fixing member fixing the display cell and the opposing plate to each other while maintaining the air gap between the display cell and the opposing plate, in which
the fixing member has one or more second air holes that mitigate variation in air pressure, the air pressure being generated in the air gap when the display cell is caused to vibrate by vibration of one or more vibration exciters.

(7)
The display apparatus according to any one of (1) to (6), in which the display cell has one or more gaps or one or more third air holes that mitigate variation in air pressure, the air pressure being generated in the air gap between the display cell and the opposing plate when the display cell is caused to vibrate by vibration of one or more vibration exciters.

(8)
The display apparatus according to any one of (1) to (7), in which the sound-spreading adjustment member includes aluminum or stainless steel.

According to the display apparatus of the embodiment of the present disclosure, the sound-spreading adjustment layer that controls the spreading of the sound generated by the two or more vibration exciters is provided between the display cell and the two or more vibration exciters, thereby making it possible to spread the sound more greatly. This accordingly makes it possible to improve sound quality. It is to be noted that the effects of the present disclosure are not necessarily limited to the effects described here, and may be any effect described in the present specification.

The present application claims the priority on the basis of Japanese Patent Application No. 2017-254118 filed on Dec. 28, 2017 and Japanese Patent Application No. 2018-161266 filed on Aug. 30, 2018 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A display apparatus, comprising:
a display cell that displays an image, the display cell having a thin-plate shape;
two or more vibration exciters disposed on rear-surface side of the display cell, the two or more vibration exciters causing the display cell to vibrate;
an opposing plate opposed to the display cell with an air gap in between, the opposing plate supporting the two or more vibration exciters; and
a sound-spreading adjustment member disposed between the display cell and a vibration-transmitting member of the two or more vibration exciters, the vibration-transmitting member having a repelling property in a sound wave region, and the sound-spreading adjustment member controlling spreading of a sound generated by vibration of the display cell caused by the two or more vibration exciters,
wherein
the two or more vibration exciters are arranged in an upper-lower direction or a left-right direction of the display cell, and
the sound-spreading adjustment member has a shape that extends in an arrangement direction of the two or more vibration exciters, a direction orthogonal to the arrangement direction of the two or more vibration exciters, or a direction intersecting with the arrangement direction of the two or more vibration exciters, and
wherein
the opposing plate has one or more air holes that mitigate variation in air pressure, the air pressure being generated in the air gap when the display cell is caused to vibrate by vibration of one or more vibration exciters, and
the sound-spreading adjustment member has a shape that extends in a direction coincident with, in a direction orthogonal to, or in a direction intersecting with a direction in which the one or more air holes are provided with respect to each of the vibration exciters.

2. The display apparatus according to claim 1, wherein
the sound-spreading adjustment member has a square shape, and
the two or more vibration exciters are disposed at respective biased positions within a region opposed to the sound-spreading adjustment member.

3. The display apparatus according to claim 1, further comprising
a signal processor that controls the two or more vibration exciters on a group basis when the two or more vibration exciters are divided into two or more groups, wherein
the sound-spreading adjustment member is provided common to each of the groups.

4. The display apparatus according to claim 1, wherein the display cell has one or more gaps or one or more air holes that mitigate variation in air pressure, the air pressure being generated in the air gap between the display cell and the opposing plate when the display cell is caused to vibrate by vibration of one or more vibration exciters.

5. The display apparatus according to claim 1, wherein the sound-spreading adjustment member includes aluminum or stainless steel.

6. A display apparatus, comprising:
a display cell that displays an image, the display cell having a thin-plate shape;
two or more vibration exciters disposed on rear-surface side of the display cell, the two or more vibration exciters causing the display cell to vibrate;
an opposing plate opposed to the display cell with an air gap in between, the opposing plate supporting the two or more vibration exciters;
a fixing member fixing the display cell and the opposing plate to each other while maintaining the air gap between the display cell and the opposing plate, wherein
the fixing member has one or more air holes that mitigate variation in air pressure, the air pressure being generated in the air gap when the display cell is caused to vibrate by vibration of one or more vibration exciters; and
a sound-spreading adjustment member disposed between the display cell and a vibration-transmitting member of the two or more vibration exciters, the vibration-transmitting member having a repelling property in a sound wave region, and the sound-spreading adjustment member controlling spreading of a sound generated by vibration of the display cell caused by the two or more vibration exciters,
wherein
the two or more vibration exciters are arranged in an upper-lower direction or a left-right direction of the display cell, and
the sound-spreading adjustment member has a shape that extends in an arrangement direction of the two or more vibration exciters, a direction orthogonal to the arrangement direction of the two or more vibration exciters, or a direction intersecting with the arrangement direction of the two or more vibration exciters.

* * * * *